United States Patent
Suzuki

(10) Patent No.: US 9,614,999 B2
(45) Date of Patent: Apr. 4, 2017

(54) IMAGE PROCESSING APPARATUS AND IMAGE PROCESSING METHOD WITH EDGE ENHANCEMENT

(71) Applicant: SAMSUNG DISPLAY CO., LTD., Yongin-si, Gyeonggi-Do (KR)

(72) Inventor: Kenji Suzuki, Yokohama (JP)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/937,316

(22) Filed: Nov. 10, 2015

(65) Prior Publication Data
US 2016/0165096 A1    Jun. 9, 2016

(30) Foreign Application Priority Data
Dec. 5, 2014  (JP) .................. 2014-246423

(51) Int. Cl.
| | | |
|---|---|---|
| G06K 9/40 | (2006.01) | |
| H04N 1/409 | (2006.01) | |
| G06T 5/00 | (2006.01) | |
| G06T 5/20 | (2006.01) | |
| G06T 7/00 | (2017.01) | |

(52) U.S. Cl.
CPC ........... *H04N 1/4092* (2013.01); *G06T 5/003* (2013.01); *G06T 5/20* (2013.01); *G06T 7/0083* (2013.01)

(58) Field of Classification Search
CPC ............ G06T 7/0085; G06T 5/003; G06T 2207/20024; G06T 2207/20192; H04N 9/646; H04N 1/4092; H04N 1/58
See application file for complete search history.

(56) References Cited

U.S. PATENT DOCUMENTS

| | | | | |
|---|---|---|---|---|
| 5,142,592 A | * | 8/1992 | Moler ............... | G06K 9/36 382/200 |
| 5,697,001 A | * | 12/1997 | Ring ............... | G03B 17/24 396/121 |
| 7,251,053 B1 | | 7/2007 | Yoshida | |
| 7,551,792 B2 | | 6/2009 | Kong et al. | |

FOREIGN PATENT DOCUMENTS

| | | | |
|---|---|---|---|
| EP | 1137258 A2 * | 1/2001 | ............... H04N 1/41 |
| EP | 2760209 | 7/2014 | |
| JP | 2000115526 | 4/2000 | |

(Continued)

*Primary Examiner* — Eueng-Nan Yeh
(74) *Attorney, Agent, or Firm* — F. Chau & Associates, LLC

(57) ABSTRACT

An image processing apparatus includes a gain calculation unit that calculates a plurality of first gains that respectively correspond to a plurality of predetermined edges based on a target pixel value and values of pixels adjacent to the target pixel, a blend ratio calculation unit that calculates a plurality of characteristic amounts that represent an accuracy of detecting the plurality of edges based on the target pixel value and the adjacent pixel values and calculates a plurality of weights that respectively correspond to the plurality of first gains based on the plurality of characteristic amounts, a gain adjustment unit that calculates a second gain based on the plurality of first gains and the plurality of weights and an output image generation unit that applies the second gain to the target pixel value to generate output image data.

20 Claims, 21 Drawing Sheets

(56) References Cited

FOREIGN PATENT DOCUMENTS

| | | |
|---|---|---|
| JP | 2001053974 | 2/2001 |
| JP | 2007241352 | 9/2007 |
| JP | 2010525142 | 7/2010 |
| JP | 2010226260 | 10/2010 |
| JP | 2015114729 | 6/2015 |
| KR | 1020070091559 | 9/2007 |
| WO | 2010073582 | 7/2010 |

* cited by examiner

Line Edge
(Single Peak)

Step Edge

IMAGE PROCESSING APPARATUS AND IMAGE PROCESSING METHOD WITH EDGE ENHANCEMENT

CROSS-REFERENCE TO RELATED APPLICATIONS

This U.S. non-provisional patent application claims priority under 35 U.S.C. §119 from, and the benefit of, Japanese Patent Application No. JP2014-246423, filed on Dec. 5, 2014, the contents of which are herein incorporated by reference in their entirety.

BACKGROUND

Embodiments of the present disclosure herein are directed to an image processing apparatus and an image processing method.

To more clearly display an image, image processing can be performed to emphasize an edge such as a contour of the image. A particular example of the image processing for emphasizing the edge may include fuzzy mask processing.

When fuzzy mask processing is performed on an input image, ringing artifacts, also referred to simply as ringing, not in the input image may appear in the output image. The ringing results from undershoot or overshoot generated at an edge portion when the fuzzy mask processing is performed on the input image.

SUMMARY

Embodiments of the present disclosure can provide an image processing apparatus, an image processing method, and a program that may inhibit ringing and emphasize an edge in a desired manner.

An embodiment of the inventive concept provides an image processing apparatus that includes a gain calculation unit that calculates a plurality of first gains that respectively correspond to a plurality of predetermined edges based on a target pixel value and values of pixels adjacent to the target pixel; a blend ratio calculation unit that calculates a plurality of characteristic amounts that represent an accuracy of detecting the plurality of edges based on the target pixel value and the values of adjacent pixels and calculates a plurality of weights that respectively correspond to the plurality of first gains based on the plurality of characteristic amounts; a gain adjustment unit that calculates a second gain based on the plurality of first gains and the plurality of weights; and an output image generation unit that applies the second gain to the target pixel value to generate output image data.

In an embodiment, the blend ratio calculation unit may calculate the plurality of characteristic amounts based on a gradient and laplacian calculated based on values of pixels located within a certain range of the target pixel.

In an embodiment, the blend ratio calculation unit may calculate, for a first edge of the plurality of edges, a plurality of first characteristic amounts based on the gradient and laplacian, calculate maximum and minimum values of the plurality of first characteristic amounts from the plurality of first characteristic amounts, and calculate a second characteristic amount that represents an accuracy of detecting the first edge based on a differential between absolute values of the maximum and minimum values.

In an embodiment, the blend ratio calculation unit may calculate, for a second edge of the plurality of edges, a plurality of first characteristic amounts based on the gradient and laplacian, calculate maximum and minimum values of the plurality of first characteristic amounts from the plurality of first characteristic amounts, and calculate a second characteristic amount that represents an accuracy of detecting the second edge based on a differential between the maximum and minimum values and an average of the maximum and minimum values.

In an embodiment, the blend ratio calculation unit may calculate a characteristic amount that represents an accuracy of detecting a third edge of the plurality of edges based on a plurality of gradients calculated based on values pixels in a certain range from the target pixel.

In an embodiment, the blend ratio calculation unit may calculate the characteristic amount based on a differential between maximum and minimum values of the plurality of gradients and an absolute value of a gradient calculated based on the target pixel.

In an embodiment, the blend ratio calculation unit may calculate a characteristic amount that represents an accuracy of detecting a fourth edge of the plurality of edges based on a plurality of laplacians calculated based on values pixels in a certain range from the target pixel.

In an embodiment, the blend ratio calculation unit may determine a greater of absolute values of maximum and minimum values of the plurality of laplacians.

In an embodiment, the gain calculation unit may calculate the plurality of first gains based on gradients and laplacians of the target pixel calculated based on values of pixels adjacent to the target pixel.

In an embodiment, the plurality of first gains may include a horizontal first gain calculated based on values of pixels adjacent to the target pixel in a horizontal direction and a vertical first gain calculated based on values of pixels adjacent in a vertical direction.

In an embodiment, the image processing apparatus may further include a magnification unit that magnifies first image data having a first resolution to convert the first image data into second image data having a second resolution higher than the first resolution and outputs the second image data as the input image data.

An embodiment of the inventive concept provides an image processing method that includes calculating a plurality of first gains that respectively correspond to a plurality of predetermined edges based on a target pixel value of an input image and values of pixels v adjacent to the target pixel; calculating a plurality of characteristic amounts that represent an accuracy of detecting the plurality of edges based on the target pixel value and the adjacent pixel values; calculating a plurality of weights that respectively correspond to the plurality of predetermined edges based on the plurality of characteristic amounts; calculating a second gain based on the plurality of first gains and the plurality of weights; and applying the second gain to the target pixel value to generate an output image.

In an embodiment, the plurality of first gains are calculated from gradients and laplacians of the target pixel calculated based on values of pixels adjacent to the target pixel.

In an embodiment, calculating the plurality of characteristic amounts comprises calculating, for a first edge of the plurality of edges, a plurality of first characteristic amounts based on a gradient and laplacian calculated based on values of pixels located within a certain range of the target pixel, calculating maximum and minimum values of the plurality of first characteristic amounts from the plurality of first characteristic amounts, and calculating a second characteristic amount that represents an accuracy of detecting the first edge based on a differential between absolute values of the maximum and minimum values, wherein a weight for the first edge is calculated from the second characteristic amount.

In an embodiment, calculating the plurality of characteristic amounts comprises calculating, for a second edge of the plurality of edges, a plurality of first characteristic amounts based on a gradient and laplacian calculated based on values of pixels located within a certain range of the target pixel, calculating maximum and minimum values of the plurality of first characteristic amounts from the plurality of first characteristic amounts, and calculating a second characteristic amount that represents an accuracy of detecting the second edge based on a differential between the maximum and minimum values and an average of the maximum and minimum values, wherein a weight for the second edge is calculated from the second characteristic amount.

In an embodiment, calculating the plurality of characteristic amounts comprises calculating a characteristic amount that represents an accuracy of detecting a third edge of the plurality of edges based on a differential between maximum and minimum values of a plurality of gradients calculated based on values of pixels in a certain range of the target pixel, and an absolute value of a gradient calculated based on the target pixel.

In an embodiment, calculating the plurality of characteristic amounts comprises calculating a characteristic amount that represents an accuracy of detecting a fourth edge of the plurality of edges based on a plurality of laplacians calculated based on values of pixels in a certain range of the target pixel, and determining a greater of absolute values of maximum and minimum values of the plurality of laplacians as the characteristic amount.

In an embodiment, the method may further include magnifying first image data having a first resolution to convert the first image data into second image data having a second resolution higher than the first resolution and outputting the second image data as the input image data.

An embodiment of the inventive concept provides an image processing apparatus that includes a blend ratio calculation unit that calculates a plurality of characteristic amounts that represent an accuracy of detecting a plurality of edges based on a target pixel value and values of adjacent pixels and calculates a plurality of weights that respectively correspond to the plurality of edges based on the plurality of characteristic amounts. The blend ratio calculation unit calculates, for a first edge of the plurality of edges, a plurality of first characteristic amounts based on a gradient and laplacian calculated based on values of pixels located within a certain range of the target pixel, maximum and minimum values of the plurality of first characteristic amounts from the plurality of first characteristic amounts, and a second characteristic amount that represents an accuracy of detecting the first edge based on a differential between absolute values of the maximum and minimum values, for a second edge of the plurality of edges, a plurality of first characteristic amounts based on a gradient and laplacian calculated based on values of pixels located within a certain range of the target pixel, maximum and minimum values of the plurality of first characteristic amounts from the plurality of first characteristic amounts, and a second characteristic amount that represents an accuracy of detecting the second edge based on a differential between the maximum and minimum values and an average of the maximum and minimum values, for a third edge of the plurality of edges, a differential between maximum and minimum values of a plurality of gradients calculated based on values of pixels in a certain range of the target pixel, and an absolute value of a gradient calculated based on the target pixel, and for a fourth edge of the plurality of edges, a plurality of laplacians based on values of pixels in a certain range of the target pixel, and a greater of absolute values of maximum and minimum values of the plurality of laplacians as the characteristic amount.

In an embodiment, the image processing apparatus may further include a gain calculation unit that calculates a plurality of first gains that respectively correspond to the plurality of predetermined edges based on the target pixel value and values of pixels adjacent to the target pixel; a gain adjustment unit that calculates a second gain based on the plurality of first gains and the plurality of weights; and an output image generation unit that applies the second gain to the target pixel value to generate output image data.

DETAILED DESCRIPTION

In the following, exemplary embodiments of the inventive concept are described in detail with reference to the accompanying drawings. Also, components having substantially the same functions may be denoted by like numerals in the present disclosure and accompanying drawings and thus repetitive descriptions are omitted.

1. Overview

An overview of an image processing apparatus according to an embodiment of the inventive concept is described with reference to FIGS. 1 and 2.

Figure 1:
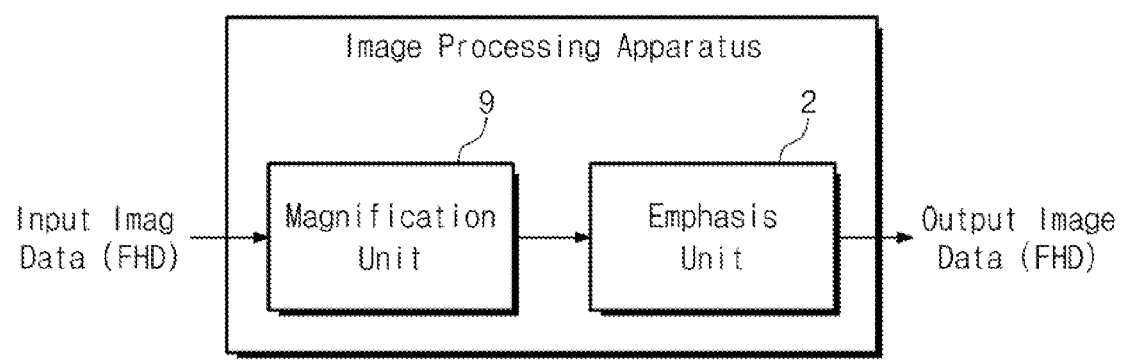
FIG. 1 is a block diagram of an exemplary schematic configuration of an image processing apparatus according to an embodiment of the inventive concept.

FIG. 1 illustrates an exemplary schematic configuration of an image processing apparatus 1 according to an embodiment of the inventive concept.

FIG. 1 illustrates an example when the image processing apparatus 1 according to a present embodiment is configured as an upscaler. That is, in the example in FIG. 1, the image processing apparatus 1 is configured to receive input image data of, e.g., a full high definition (FHD) 1920×1080 image, and magnify the input image data to generate an ultra high definition (UHD) 3840×2160 output image.

By magnifying the input image to generate an output image with higher resolution than the input image, pixel values near an edge in the image decrease due to the magnification and the edge tends to become dull or blunt. In the image processing apparatus 1 in FIG. 1, after magnifying the input image data to generate magnified image data, the image is processed to emphasize an edge. In addition, image processing that emphasizes an edge is referred to hereinbelow as edge emphasis.

As an example of the inventive concept, the image processing apparatus 1 according to a present embodiment includes a magnification unit 9 and an emphasis unit 2, as shown in FIG. 1.

The magnification unit 9 magnifies input image data based on bilinear or bicubic interpolation to convert the input image data into magnified image data having a higher resolution. In addition, the magnification unit 9 outputs the magnified image data to the emphasis unit 2.

The emphasis unit 2 performs edge emphasis on the magnified image data to generate an output image.

In particular, the emphasis unit 2 according to a present embodiment classifies edges of the magnified input image into various types of edges and applies a gain based on the edge classification to emphasize the edge.

FIGS. 2A to 2D depict an overview of an image processing apparatus according to a present embodiment.

FIGS. 2A to 2D illustrate examples of inputs according to the edge type, gains applied based on the edge type, and outputs after emphasis based on the edge type.

In FIGS. 2A to 2D, the graph labeled "input" represents a change in input value, i.e., grayscale values along a direction in the input image data. In addition, the graph labeled "gain" represents a gain applied to an input value. The graph labeled "output" represents an output value after emphasis, i.e., an output value after a gain is applied to an input value.

As illustrated in FIGS. 2A to 2D, the emphasis unit 2 according to a present embodiment classifies the edges of input image data into four types of edges, i.e., a line edge or single peak, a step edge, a toggle edge or continuous peak, and a texture edge.

In FIGS. 2A to 2D, FIG. 2A illustrate examples of an input value, a gain and an output value corresponding to a line edge. Likewise, FIGS. 2B to 2D correspond to a step edge, a toggle edge or continuous peak, and a texture edge, respectively and illustrate examples of input values, gains and output values corresponding to each edge type.

Figure 2A:
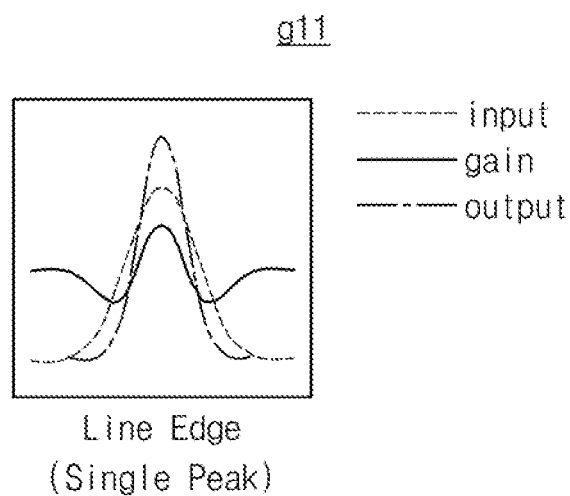
FIGS. 2A to 2D depict an overview of an image processing apparatus according to a present embodiment.

As shown in FIG. 2A, a line edge has a single peak with no reverse-polarity peaks around that peak. A line edge represents a line in the image data. When an edge to be processed is a line edge, the emphasis unit 2 inhibits undershoot at the base of the peak to narrow the line width and at the same time further emphasizes the peak vertex, i.e., generates overshoot at the vertex. In addition, the polarity of the line edge peak needs to be determined to determine whether the line is a white line or a black line. The line edge corresponds to an example of a first edge.

Figure 2B:
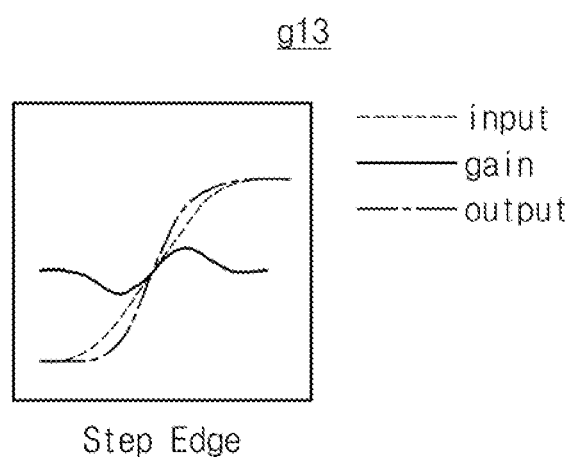

A step edge has a step-shaped change in grayscale, as shown in FIG. 2B. When an edge to be processed is a step edge, the emphasis unit 2 inhibits overshoot and undershoot and processes that image processing to sharpen a change in grayscale, i.e., the slope of the edge further rises. In addition, a step edge corresponds to an example of a third edge.

Figure 2C:
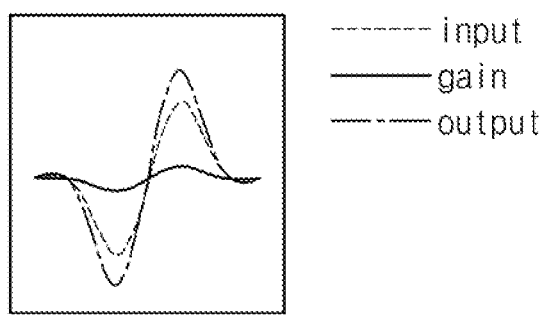
Figure 2D:
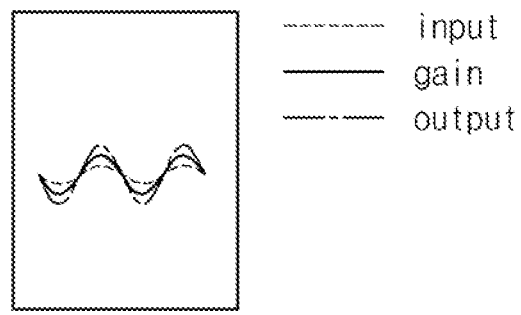

A toggle edge and a texture edge have continuous peaks with both positive and negative polarities, as shown in FIGS. 2C and 2D. When edges to be processed are a toggle edge or a texture edge, the emphasis unit 2 both overshoots and undershoots to enhance edge definition. In addition, a toggle edge corresponds to an example of a second edge and a texture edge corresponds to a fourth edge.

In addition, in the case of a toggle edge, the emphasis unit 2 lowers the amplitude ratio of a gain to an input value to de-emphasize the edge, because the amplitude of the input values is relatively large, as shown in FIGS. 2A to 2D. In the case of a texture edge, the emphasis unit 2 increases the amplitude ratio of the gain to the input value to further emphasize the edge, because the amplitude of the input values is relatively small.

As described above, the emphasis unit 2 according to a present embodiment classifies the edges of the input image data into various edge types and applies a gain based on the edge classification to emphasize the edge. In addition, processing based on the edge classification by the emphasis unit 2 or processing based on edge emphasis based on the edge classification is separately described below together with the details of the functional configuration of emphasis unit 2.

2. Functional Configuration of Emphasis Unit

An example of a functional configuration of the emphasis unit 2 according to a present embodiment is described.

2.1. Entire Configuration

A configuration of the emphasis unit 2 according to a present embodiment is described with reference to FIG. 3.

Figure 3:
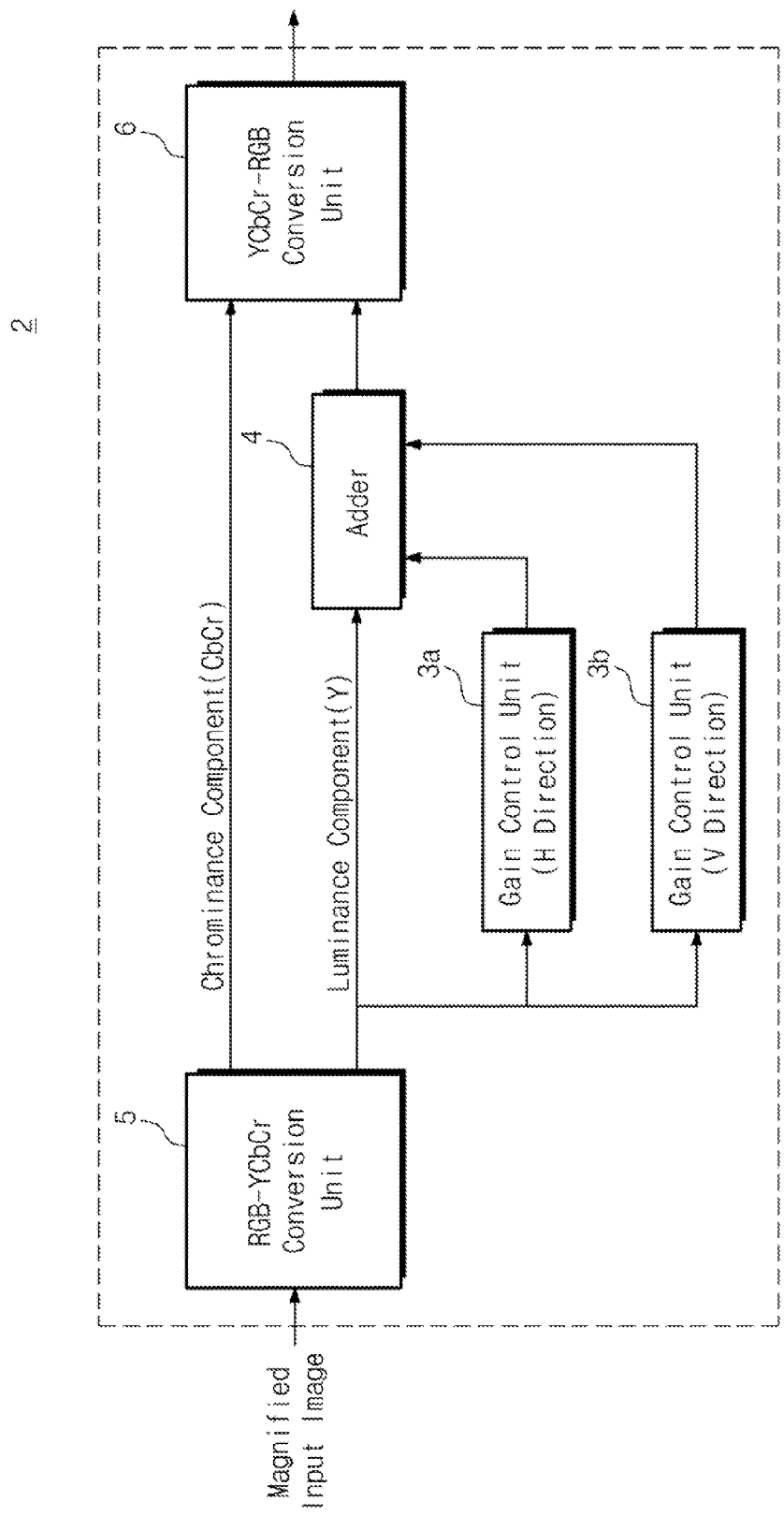
FIG. 3 is a block diagram of an exemplary functional configuration of an emphasis unit according to a present embodiment.

FIG. 3 is a block diagram of an exemplary functional configuration of the emphasizing unit 2 according to a present embodiment.

As shown in FIG. 3, the emphasis unit 2 includes an RGB-YCbCr conversion unit 5, gain control units 3a and 3b, an adder 4, and an YCbCr-RGB conversion unit 6.

The RGB-YCbCr conversion unit 5 converts RGB components of each pixel of the magnified input image received from the magnification unit 9 into a luminance component Y and chrominance components Cb and Cr. In addition, the RGB-YCbCr conversion unit 5 outputs the luminance component Y of each pixel to the gain control units 3a and 3b and the adder 4 and outputs the chrominance components Cb and Cr to the YCbCr-RGB conversion unit 6.

The gain control unit 3a receives the luminance component Y of the magnified input image from the RGB-YCbCr conversion unit 5. The gain control unit 3a processes each pixel of the magnified input image as a target pixel, determines the edge type based on the horizontal (H) direction of the magnified input image for each target pixel, and calculates a gain corresponding to the H direction of the determined type. In addition, the gain control unit 3a outputs, to the adder 4, a gain corresponding to the H direction calculated for each target pixel.

In addition, the gain control unit 3b receives the luminance component Y of the magnified input image from the RGB-YCbCr conversion unit 5. The gain control unit 3b processes each pixel of the magnified input image as a target pixel, determines the edge type based on the vertical V direction of the magnified input image for each target pixel, and calculates a gain corresponding to the V direction of the determined type. In addition, the gain control unit 3b outputs, to the adder 4, a gain corresponding to the V direction calculated for each target pixel.

The adder 4 receives the luminance component Y of the magnified input image from the RGB-YCbCr conversion unit 5. In addition, the adder 4 receives from the gain control unit 3a the gain corresponding to the H direction calculated for each pixel of the magnified input image, and receives from the gain control unit 3b the gain corresponding to the V direction calculated for each pixel of the magnified input image.

The adder 4 applies, for each pixel of the magnified input image, the H direction gain and the V direction gain to the luminance component Y of a corresponding pixel to perform edge emphasis on the luminance component Y of the magnified input image. In addition, the adder 4 outputs, to the YCbCr-RGB conversion unit 6, the luminance component Y of the magnified input image on which the edge emphasis has been performed.

Details of each of the gain control units 3a and 3b and the adder 4 are separately described below. In addition, the adder 4 corresponds to an example of an output image generation unit.

The YCbCr-RGB conversion unit 6 receives, from the RGB-YCbCr conversion unit 5, the chrominance components Cb and Cr of each pixel of input image data received by the emphasis unit 2. In addition, the YCbCr-RGB conversion unit 6 receives, from the adder 4, the luminance component of each pixel of magnified input image on which edge emphasis has been performed. The YCbCr-RGB conversion unit 6 converts the chrominance components Cb and Cr received for each pixel of magnified input image and the luminance component Y on which edge emphasis has been performed into RGB components to generate the output image.

2.2. Details of Gain Control Unit and Adder

A configuration of each of the gain control units 3a and 3b and the adder 4 of the emphasis unit 2 according to a present embodiment is described with reference to FIG. 4.

Figure 4:
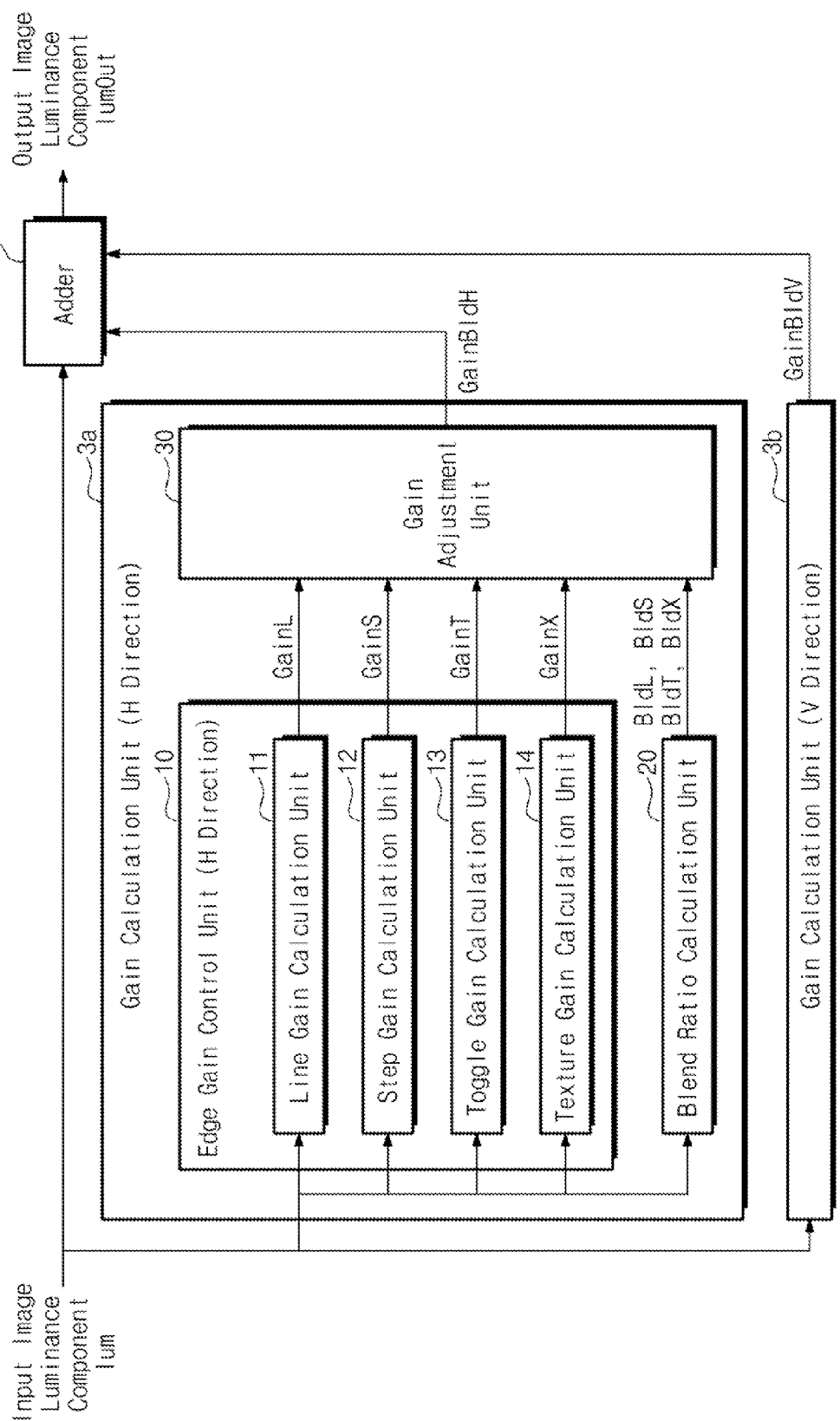
FIG. 4 is a block diagram of an exemplary functional configuration of an emphasis unit according to a present embodiment.

FIG. 4 is a block diagram of an exemplary functional configuration of an emphasizing unit according to a present embodiment.

FIG. 4 illustrates detailed configurations of the gain control units 3a and 3b and the adder 4.

The gain control units 3a and 3b have the same configuration except that the direction of an edge to be processed is different, the former being the horizontal H direction and the latter being the vertical V direction. Therefore, the descriptions of the functional configurations of the gain controls units 3a and 3b will focus on the gain control unit 3a, and a detailed description of the gain control unit 3b is omitted.

In addition, in the following description, the H direction of the magnified input image is defined as an x direction and the V direction is defined as a y direction, and the luminance component Y of a pixel located at coordinate (x, y) in the magnified input image may be indicated by lum (x,y). In addition, when describing only the x direction in the magnified input image, the luminance component lum (x,y) may be denoted by lum (x).

As shown in FIG. 4, the gain control unit 3a includes an edge gain calculation unit 10, a blend ratio calculation unit 20, and a gain adjustment unit 30. In addition, the edge gain calculation unit 10 includes a line gain calculation unit 11, a step gain calculation unit 12, a toggle gain calculation unit 13, and a texture gain calculation unit 14.

Line Gain Calculation Unit 11

The line gain calculation unit 11 calculates a gain, referred to as a line gain, for emphasizing a line edge based on the luminance component of each pixel in the input image, when an edge corresponding to a pixel is a line edge.

In particular, the line gain calculation unit 11 processes each pixel of the input image as a target pixel and calculates a gradient and laplacian based on the luminance components of the target pixel and adjacent pixels located within a certain range in the x direction from that target pixel. According to exemplary embodiments, pixels ((x+1, y) and (x−1, y)) in contact with the target pixel (x,y) in the x direction are processed as the adjacent pixels.

In this example, the luminance component of the target pixel (x,y) is denoted as lum (x), the luminance component of the adjacent pixel (x+1, y) is denoted as lum(x+1), and the luminance component of the adjacent pixel (x−1, y) is denoted as lum(x−1). Then, the gradient grad(x) of that target pixel can be calculated based on Equation (1):

$$\mathrm{grad}(x)=\mathrm{lum}(x+1)-\mathrm{lum}(x-1) \qquad (1).$$

In addition, the laplacian lap(x) of the target pixel can be calculated based on Equation (2):

$$\mathrm{lap}(x)=\mathrm{lum}(x+1)-\mathrm{lum}(x)\times 2+\mathrm{lum}(x-1) \qquad (2).$$

The line gain calculation unit 11 calculates a characteristic amount seed(x) for calculating the line gain based on the gradient grad(x) and laplacian lap(x). The characteristic amount seed(x) can be calculated based on Equation (3):

$$\mathrm{seed}(x)=|\mathrm{lap}(x)|-|\mathrm{grad}(x)|\times p\mathrm{Line1} \qquad (3)$$

where coefficient pLine1 is a coefficient for adjusting the ratio between the peak portion (i.e., vertex) and base portion of the pixel luminance of each pixel after emphasis. In particular, the smaller the coefficient pLine1 is, the thinner the line width of a line edge, and the larger the coefficient pLine1 is, the thicker the line width of the line edge. In addition, a larger value for the coefficient pLine1 tends to decrease the inhibitory effect of ringing, i.e., the ringing more readily occurs.

Figure 5:
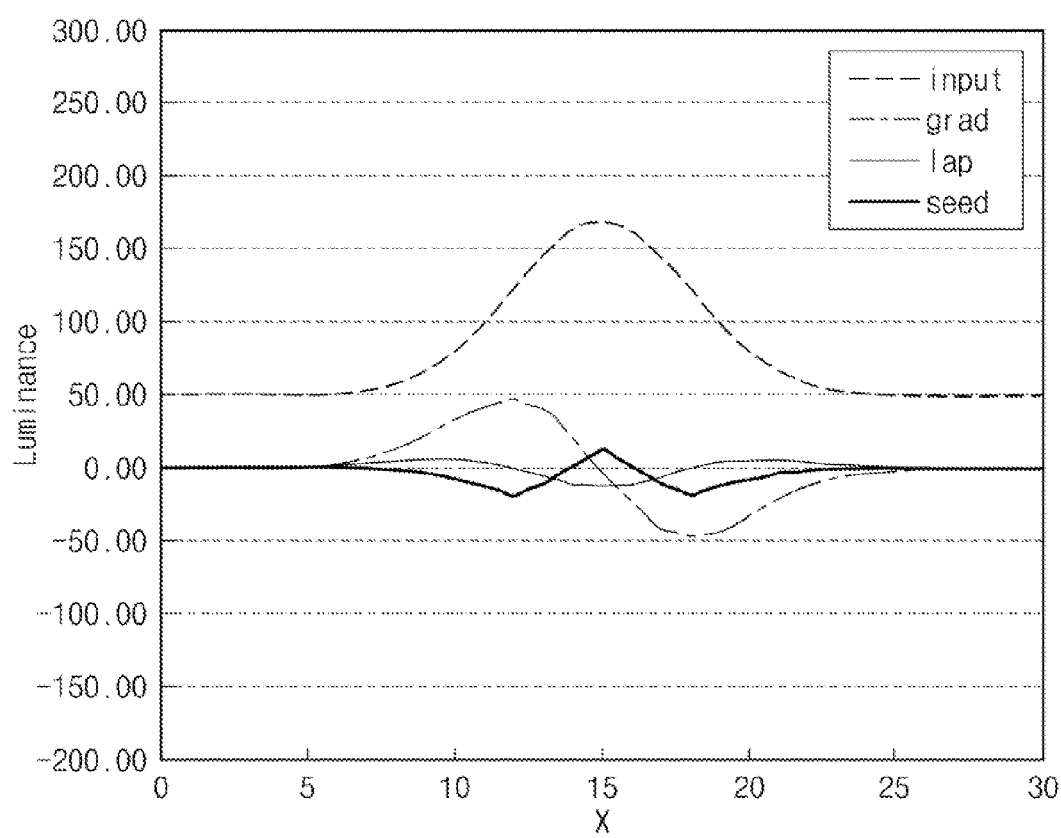
FIG. 5 illustrates an example of the relationship among a pixel luminance, a gradient grad(x), a laplacian lap(x), and a characteristic amount seed(x) of an input image when an edge corresponding to a target pixel is a line edge.

FIG. 5 illustrates an example of a relationship among a pixel value or luminance, a gradient grad(x), a laplacian lap(x), and a characteristic amount seed(x) of the input image when an edge corresponding to a target pixel is a line edge.

Referring to FIG. 5, the horizontal axis represents a location along the x direction in the input image, and the vertical axis represents a pixel value of a corresponding pixel. The graph labeled "input" in FIG. 5 represents the pixel luminance of each pixel of the input image. The graph labeled "grad" represents the gradient grad(x) calculated for each pixel of the input image. The graph labeled "lap" represents the Laplacian lap(x) calculated for each pixel of the input image. The graph labeled "seed" represents the characteristic amount seed(x) calculated for each pixel of the input image.

The example of FIG. 5 corresponds to a case when the peak of each pixel luminance is positive, i.e., when the pixel values of an edge portion correspond to a bright or white line having a grayscale value greater than those of the adjacent pixels. In addition, when the pixel value of an edge portion is a dark or black line having a grayscale value less than those of the adjacent pixels, it is possible to reverse the minus and plus or positive and negative polarities of each graph in FIG. 5.

The line gain calculation unit 11 calculates a line gain GainL(x) for each pixel based on the characteristic amount seed(x) calculated for each pixel. The line gain GainL(x) can be calculated based on Equation (4)

$$GainL(x) = \begin{cases} seed(x) \times pLine0P & seed(x) > 0 \\ seed(x) \times pLine0M & seed(x) \leq 0 \end{cases}. \quad (4)$$

The coefficient pLine0P in Equation (4) adjusts an emphasis amount for a peak portion in the pixel luminance of each pixel when an edge corresponding to a target pixel is a line edge. The coefficient pLine0M adjusts an emphasis amount for a base portion in the pixel luminance of each pixel when an edge corresponding to a target pixel is a line edge. The coefficients pLine0P and pLine0M can be pre-determined based on previous experimental results.

Figure 6:
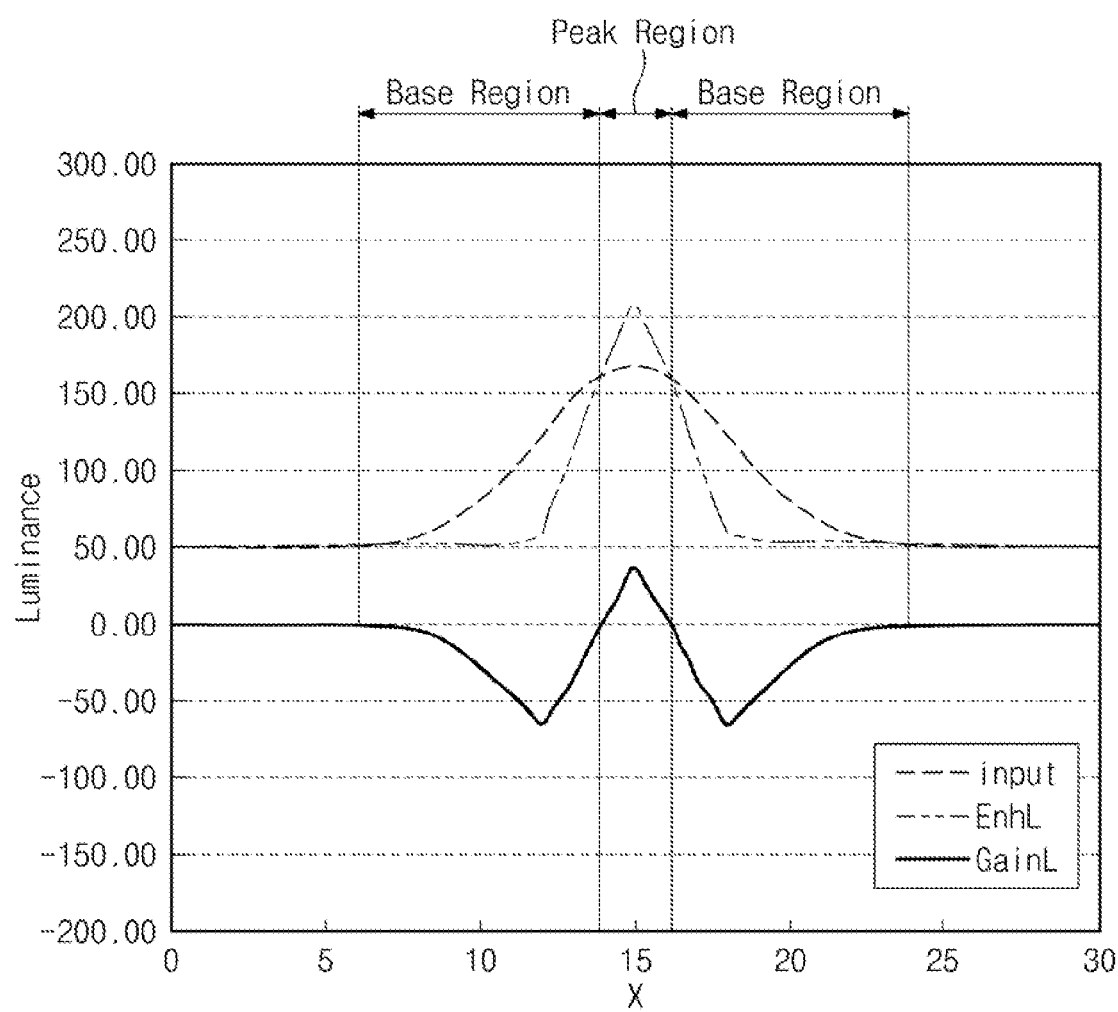
FIG. 6 illustrates an example of the relationship among a pixel luminance, a line gain GainL(x) and a pixel luminance after emphasizing an input image when a line edge corresponds to a target pixel.

FIG. 6 illustrates an example of the relationship among a pixel vluminance, a line gain GainL(x) and a pixel luminance after emphasizing the input image when a line edge corresponds to a target pixel.

Referring to FIG. 6, the horizontal axis represents a location along the x direction in the input image, and the vertical axis represents the pixel value of a corresponding pixel. The graph labeled "input" in FIG. 6 represents the pixel luminance of each pixel in the input image. The graph labeled "GainL" represents the line gain GainL(x) calculated for each pixel in the input image. The graph labeled "EnhL" represents the pixel luminance after emphasis, where EnhL is defined by EnhL=input+GainL.

As such, the line gain calculation unit 11 applies different coefficients to portions corresponding to the peak of the line edge, which is a portion at which the characteristic amount seed(x) is positive, and to portions corresponding to the base of the line edge, which is a portion at which the characteristic amount seed(x) is negative, to calculate the line gain GainL(x). In particular, the line gain calculation unit 11 calculates the line gain GainL(x) to inhibit undershoot at the base portion, and to emphasize the peak portion, as shown in FIG. 6.

In addition, the formula represented above is exemplary and non-limiting, and other methods of calculating a gain having the same feature are possible.

An exemplary method of calculating gradient grad(x) based on the pixel values of adjacent pixels on opposite sides of a target pixel has been described above. In other embodiments of the inventive concept, the gradient grad(x) can be calculated by subtracting, from the sum of the pixel values of two adjacent pixels located at one side of the target pixel, the sum of the pixel values of two adjacent pixels located at the other side of the target pixel. In still other embodiments, a noise removal filter such as a smoothing filter can be applied to input image data the line gain GainL(x) can be calculated based on the filtered input image data.

As such, the line gain calculation unit 11 calculates a line gain GainL(x) for each pixel in the input image and outputs the line gain GainL(x) for each pixel to the gain adjustment unit 30.

Step Gain Calculation Unit 12

The step gain calculation unit 12 calculates a gain, hereinafter referred to as a step gain, for emphasizing a step edge based on the luminance component of each pixel of the input image, when an edge corresponding to that pixel is the step edge.

In particular, the step gain calculation unit 12 processes each pixel of the input image as a target pixel and calculates a gradient grad(x) and laplacian lap(x) based on the luminance components of the target pixel and of adjacent pixels located within a certain range from the target pixel in the x direction. The gradient grad(x) and laplacian lap(x) are calculated based on Equations (1) and (2) as described above.

The step gain calculation unit 12 calculates the maximum value gradMax(x) of the gradient grad(x) for each pixel within a certain range from target pixel (x,y), based on the gradient grad(x) calculated for each pixel within a corresponding range. For example, when the certain range corresponds to three pixels on either side of the target pixel (x,y) in the x direction, i.e., the range corresponds to seven pixels with the target pixel in a central position, the maximum value gradMax(x) of the gradient grad(x) can be calculated based on Equation (5) below:

$$gradMax(x) = \max_{-3 \leq i \leq 3} |grad(x+i)|. \quad (5)$$

Figure 7:
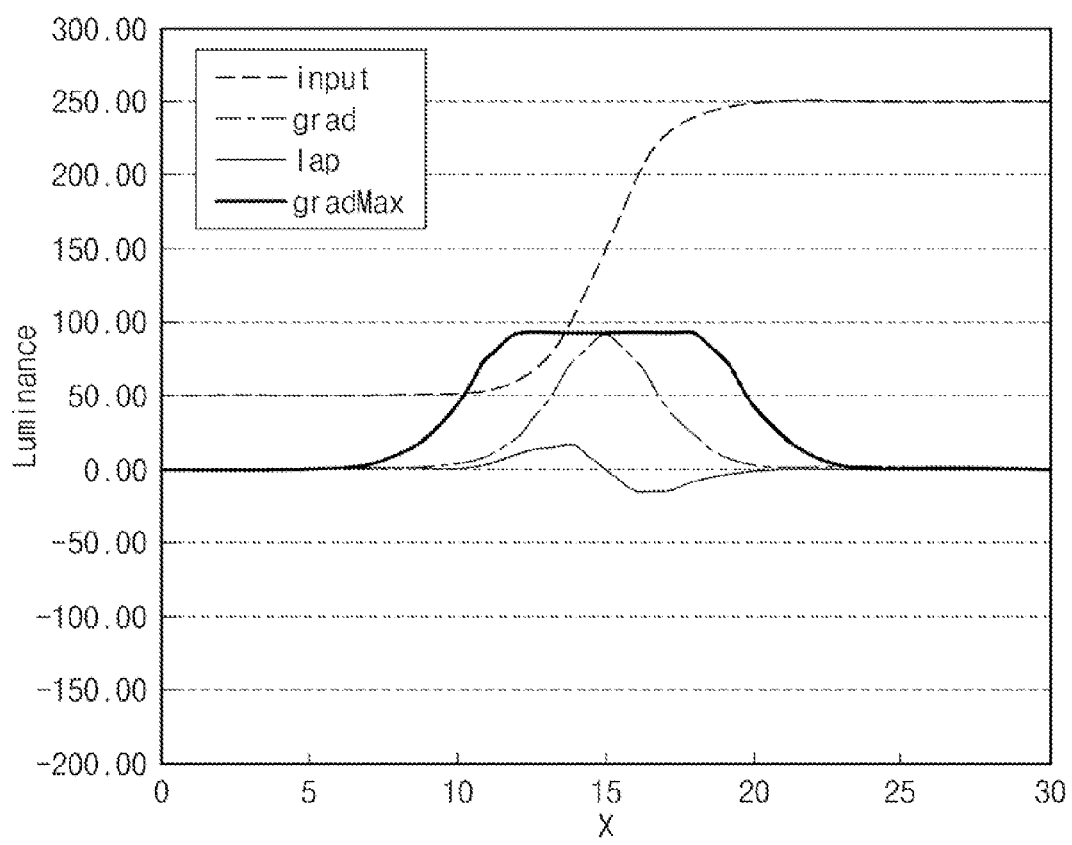
FIG. 7 illustrates an example of the relationship among a pixel luminance, a gradient grad(x), a laplacian lap(x), and a maximum value gradMax(x) of a gradient grad(x) of input image when an edge corresponding to a target pixel is a step edge.

FIG. 7 illustrates an example of the relationship among a pixel value (luminance), a gradient grad(x), a laplacian lap(x), and a maximum value gradMax(x) of a gradient grad(x) of the input image when an edge corresponding to a target pixel is a step edge.

Referring to FIG. 7, the horizontal axis represents a location along to the x direction in the input image, and the vertical axis represents the pixel value of a corresponding pixel. The graph labeled "input" in FIG. 7 represents the pixel luminance of each pixel in the input image. The graph labeled "grad" represents the gradient grad(x) for each pixel in the input image data. The graph labeled "lap" represents the laplacian lap(x) for each pixel in the input image. The graph labeled "gradMax" represents the maximum value gradMax(x) of the gradient grad(x) for each pixel in the input image data.

The step gain calculation unit 12 calculates a step gain GainS(x) for each pixel based on the maximum value gradMax(x) of the gradient grad(x) and laplacian lap(x) for each pixel. The step gain GainS(x) can be calculated based on Equation (6) below:

$$GainS(x) = \begin{cases} \text{lap}(x) \times \dfrac{|\text{grad}(x)|}{\text{gradMax}(x)} \times p\text{Step} & \text{gradMax}(x) > 0 \\ 0 & \text{gradMax}(x) = 0 \end{cases} \quad (6)$$

The coefficient pStep in Equation (6) adjusts an emphasis amount for the pixel luminance of each pixel when an edge corresponding to a target pixel is a step edge. The coefficient pStep can be pre-determined based on previous experimental results.

Figure 8:
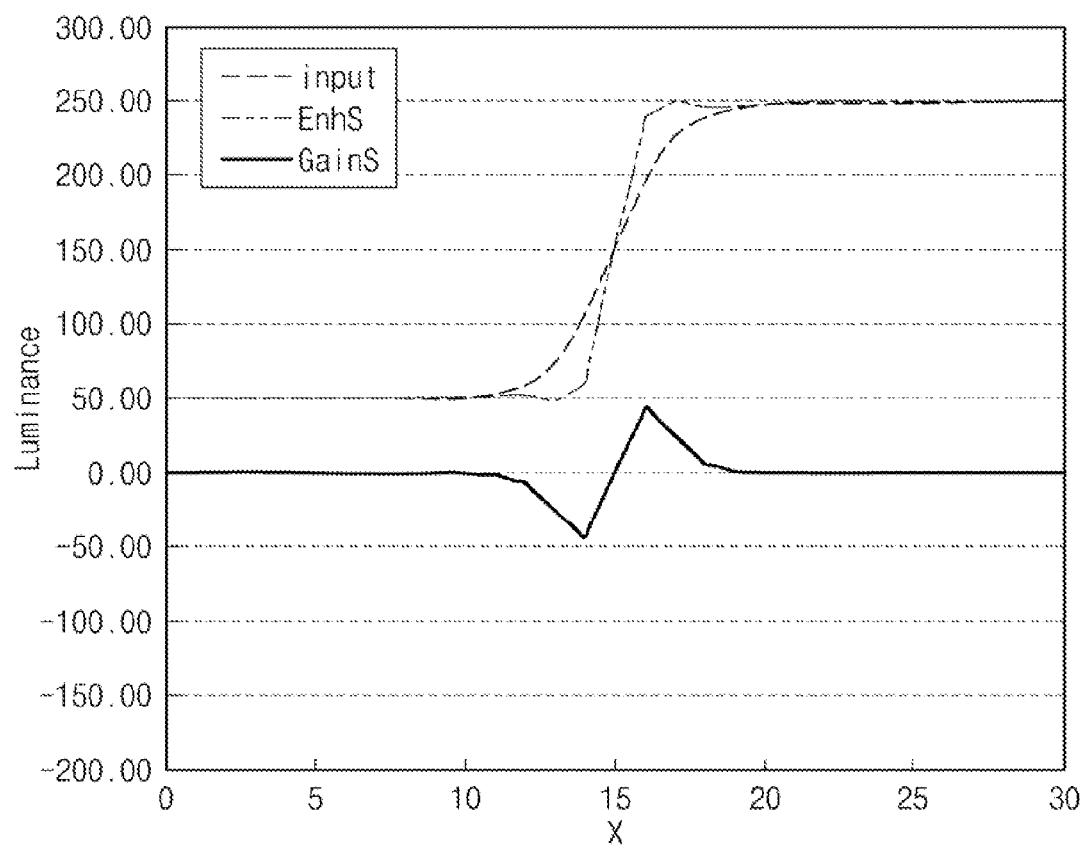
FIG. 8 illustrates an example of the relationship among a pixel luminance, a step gain GainS(x) and a pixel value (luminance) after emphasizing input image data when a step edge corresponds to a target pixel.

FIG. 8 illustrates an example of the relationship among a pixel luminance, a step gain GainS(x) and a pixel luminance after emphasizing the input image when an step edge corresponds to a target pixel.

Referring to FIG. 8, the horizontal axis represents a location along to the x direction in the input image, and the vertical axis represents the pixel value of a corresponding pixel. The graph labeled "input" in FIG. 8 represents the pixel luminance of each pixel in the input image. The graph labeled "GainS" represents the step gain GainS(x) calculated for each pixel in the input image. The graph labeled "EnhS" represents the pixel luminance after emphasis, and can be defined by EnhS=input+GainS.

As shown in FIG. 8, the step gain calculation unit 12 inhibits overshoot and undershoot and calculates the step gain GainS(x) to sharpen a change in pixel luminance.

The formula expressed above is exemplary and non-limiting, and other methods of calculating a gain having the same characteristics are possible.

As such, the step gain calculation unit 12 calculates the step gain GainS(x) for each pixel in the input image data and outputs the step gain GainS(x) calculated for each pixel to the gain adjustment unit 30.

Toggle Gain Calculation Unit 13

The toggle gain calculation unit 13 calculates a gain, hereinafter referred to as a toggle gain, for emphasizing a toggle edge based on the luminance components of each pixel in the image, when an edge corresponding to that pixel is a toggle edge.

In particular, the toggle gain calculation unit 13 processes each pixel of the input image as a target pixel and calculates a laplacian lap(x) based on the luminance components of the target pixel and of adjacent pixels located within a certain range from the target pixel in the x direction. The laplacian lap(x) can be calculated based on Equation (2) as described above.

The toggle gain calculation unit 13 calculates a toggle gain GainT(x) for each pixel based on the laplacian lap(x) calculated for each pixel. The toggle gain GainT(x) can be calculated based on Equation (7) below:

$$GainT(x) = \text{lap}(x) \times p\text{Toggle} \quad (7)$$

The coefficient pToggle in Equation (7) adjusts an emphasis amount for the pixel luminance of each pixel when an edge corresponding to a target pixel is a toggle edge. The coefficient pToggle can be pre-determined based on previous experimental results.

As such, the toggle gain calculation unit 13 calculates the toggle gain GainT(x) for each pixel in the input image and outputs the toggle gain GainT(x) for each pixel to the gain adjustment unit 30.

Texture Gain Calculation Unit 14

The texture gain calculation unit 14 calculates a gain, hereinafter referred to as a texture gain, for emphasizing a texture edge based on the luminance component of each pixel in the input image, when an edge corresponding to that pixel is the texture edge.

In particular, the texture gain calculation unit 14 processes each pixel of the input image data as a target pixel and calculates a laplacian lap(x) based on the luminance components of the target pixel and of adjacent pixels located within a certain range from the target pixel in the x direction. The laplacian lap(x) can be calculated based on Equation (2) as described above.

The texture gain calculation unit 14 calculates a texture gain GainX(x) for each pixel based on the laplacian lap(x) calculated for each pixel. The texture gain GainX(x) can be calculated based on Equation (8) below:

$$GainX(x) = \text{lap}(x) \times p\text{Texture} \quad (8)$$

The coefficient pTexture in Equation (8) adjusts an emphasis amount for the pixel luminance of each pixel when an edge corresponding to a target pixel is a texture edge. The coefficient pTexture can be pre-determined based on previous experimental results. According to an embodiment of the inventive concept, the coefficient pTexture and the coefficient pToggle may satisfy the relationship pToggle<pTexture.

As such, the texture gain calculation unit 14 calculates the texture gain GainX(x) for each pixel in the input image data and outputs the texture gain GainX(x) for each pixel to the gain adjustment unit 30.

Blend Ratio Calculation Unit 20

The blend ratio calculation unit 20 is described with reference to FIG. 9.

Figure 9:
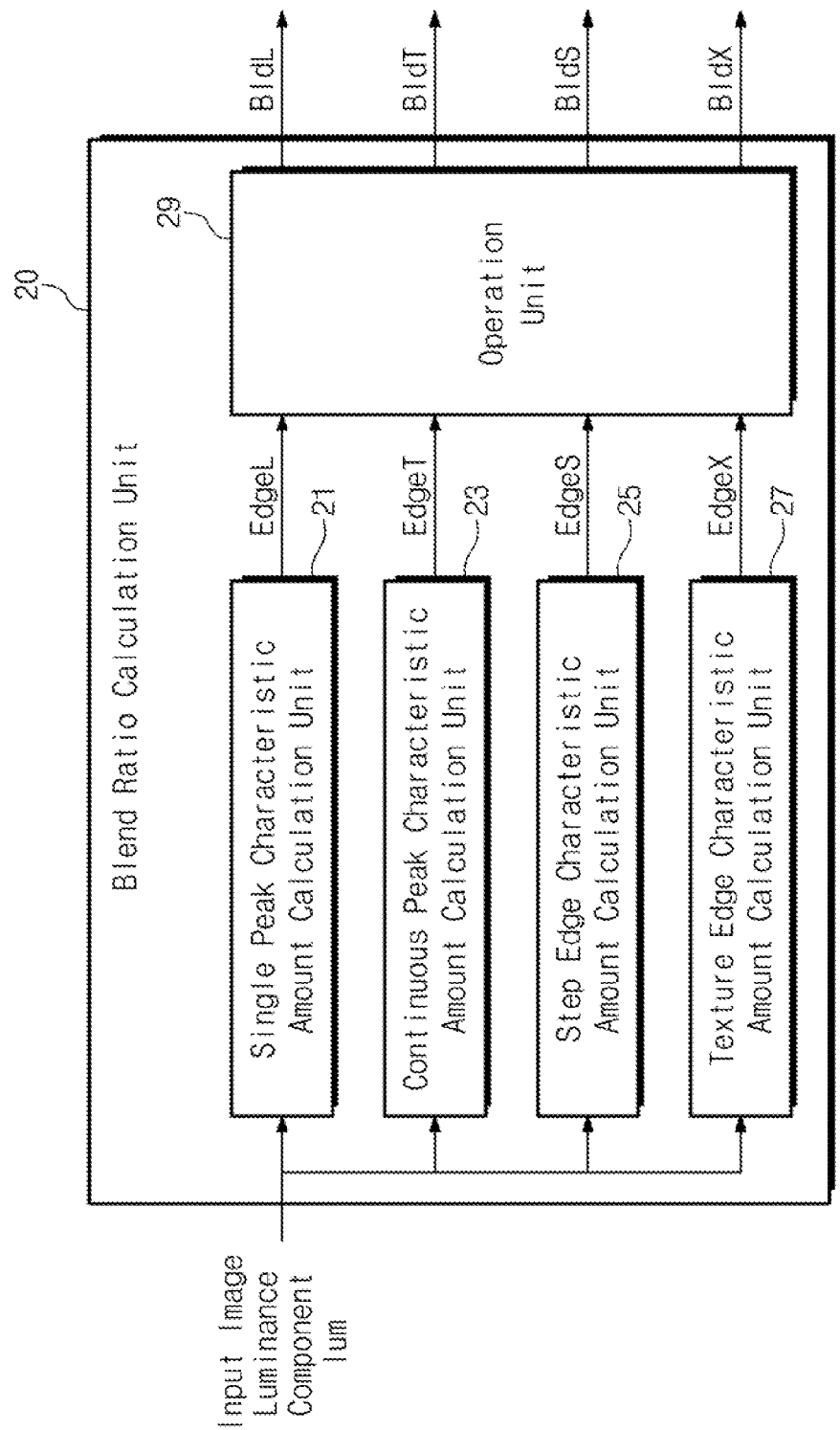
FIG. 9 is a block diagram of an exemplary functional configuration of a blend ratio calculation unit.
Figure 10:
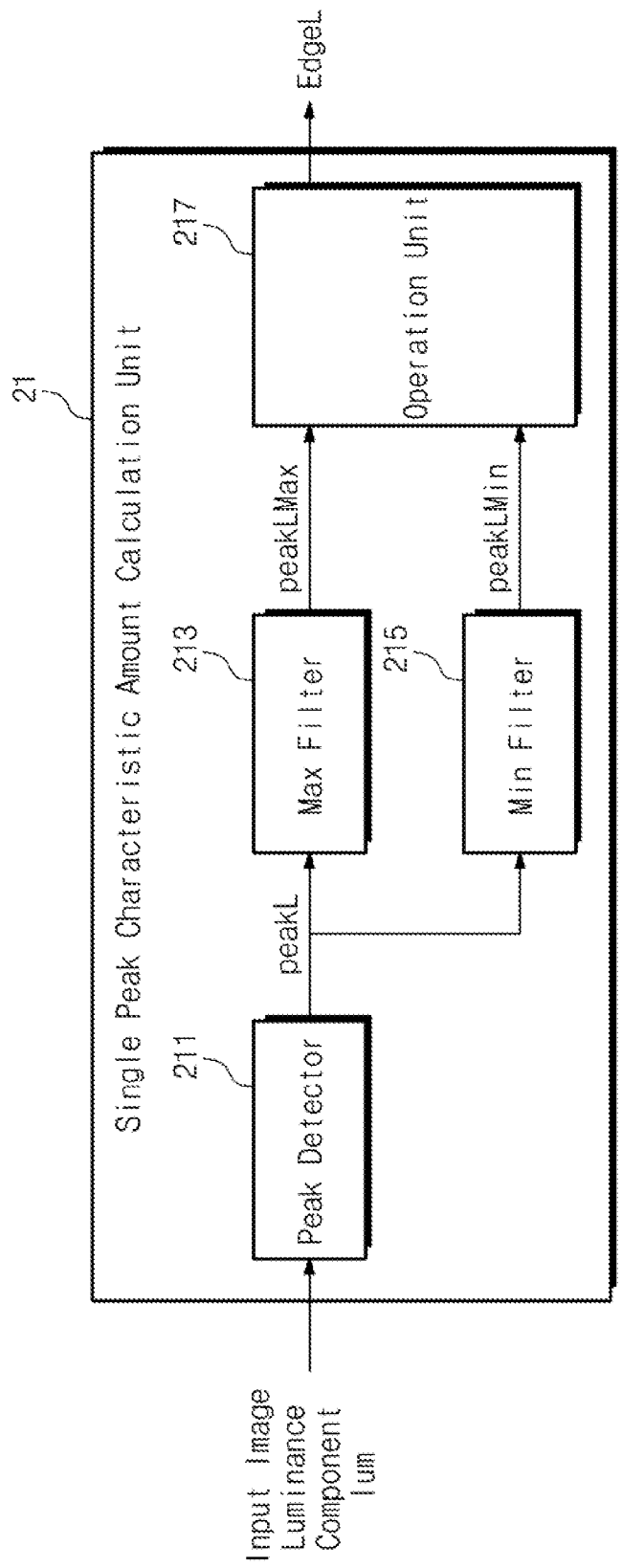
FIG. 10 is a block diagram of an exemplary functional configuration of a single peak characteristic amount calculation unit.

FIG. 9 is a block diagram of an exemplary functional configuration of the blend ratio calculation unit 20, and FIG. 10 is a block diagram of an exemplary functional configuration of a single peak characteristic amount calculation unit 21.

Referring to FIG. 9, the blend ratio calculation unit 20 includes a single peak characteristic amount calculation unit 21, a continuous peak characteristic amount calculation unit 23, a step edge characteristic amount calculation unit 25, a texture edge characteristic amount calculation unit 27, and an operation unit 29.

Single Peak Characteristic Amount Calculation Unit 21

The single peak characteristic amount calculation unit 21 can calculate, for each pixel of the input image, a characteristic amount EdgeL that represents the accuracy or certainty that an edge corresponding to a pixel is a line edge.

As illustrated in FIG. 10, the single peak characteristic amount calculation unit 21 includes a peak detector 211, a Max filter 213, a Min filter 215, and an operation unit 217.

The peak detector 211 processes each pixel in the input image as a target pixel and calculates a gradient and laplacian based on the luminance components of the target pixel and of adjacent pixels located within a certain range from the target pixel in the x direction. According to embodiments, adjacent pixels are defined as pixel (x+2, y) located at one side from target pixel (x, y) in the x direction and pixel (x−2, y) located at the other side.

The gradient grad(x) corresponding to that target pixel can be calculated based on Equation (9) below:

$$\text{grad}(x) = \text{lum}(x+2) - \text{lum}(x-2) \quad (9)$$

The laplacian lap(x) corresponding to the target pixel can be calculated based on Equation (10) below:

$$\text{lap}(x) = \text{lum}(x+2) - \text{lum}(x) \times 2 + \text{lum}(x-2) \quad (10)$$

The peak detector 211 calculates a characteristic amount peakL(x) that detects a peak portion based on the gradient grad(x) and laplacian lap(x). The characteristic amount peakL(x) can be calculated based on Equations (11) to (13) below:

$$peakL0(x) = |\text{lap}(x)| - |\text{grad}(x)| \times pPeakL, \quad (11)$$

$$peakL1(x) = \begin{cases} peakL0(x) & peakL0(x) \geq 0 \\ 0 & peakL0(x) < 0 \end{cases}, \text{ and} \quad (12)$$

$$peakL(x) = \begin{cases} peakL1(x) & \text{lap}(x) \geq 0 \\ peakL1(x) \times -1 & \text{lap}(x) < 0 \end{cases}. \quad (13)$$

The coefficient pPeakL in Equation (11) adjusts a range for detecting a line edge from edges having various line widths. According to embodiments, the coefficient pPeakL corresponds to coefficient pLine1 in Equation (3) for calculating the above-described characteristic amount seed(x). That is, a larger coefficient pPeakL can detect a wider edge as a line edge. The coefficient pPeakL may be pre-determined based on previous experimental results.

As such, the peak detector 211 can calculate a characteristic amount peakL(x) for detecting a peak portion for each pixel in the input image and outputs the characteristic amount peakL(x) for each pixel to the Max filter 213 and the Min filter 215.

The Max filter 213 receives, from the peak detector 211, the characteristic amount peakL(x) for each pixel of the input image. The Max filter 213 processes each pixel of the input image as a target pixel and calculates the maximum value of the characteristic amount peakL(x) for each pixel within a certain range from the target pixel, based on the characteristic amount peakL(x) calculated within a corresponding range.

For example, when the certain range corresponds to five pixels before and after target pixel (x, y) in the x direction, i.e., the range corresponds to 11 pixels in which the target pixel has a central position, the maximum value of the characteristic amount peakL(x) can be calculated based on Equation (15):

$$peakLMax(x) = \max_{-5 \leq i \leq 5}(peakL(x+i)). \quad (15)$$

In addition, the Max filter 213 outputs, to the operation unit 217, the maximum value peakLMax(x) of the characteristic amount peakL(x) for each pixel.

The Min filter 215 receives, from the peak detector 211, the characteristic amount peakL(x) for each pixel of the input image. The Min filter 215 processes each pixel of the input image as a target pixel and calculates the minimum value of the characteristic amount peakL(x) for each pixel within a certain range from the target pixel, based on the characteristic amount peakL(x) calculated within the certain range.

For example, when the certain range corresponds to five pixels before and after target pixel (x, y) in the x direction, i.e., the range corresponds to 11 pixels in which the target pixel has a central position, the minimum value of the characteristic amount peakL(x) can be calculated based on Equation (16):

$$peakLMin(x) = \min_{-5 \leq i \leq 5}(peakL(x+i)). \quad (16)$$

In addition, the Min filter 215 outputs, to the operation unit 217, the minimum value peakLMin(x) of the characteristic amount peakL(x) for each pixel.

The range of the Max filter 213 and the Min filter 215 for calculating the maximum value peakLMax(x) and minimum value peakLMin(x) of the characteristic amount peakL(x) is exemplary and non-limiting. and embodiments of the inventive concept are not necessarily limited to the ranges disclosed above, nor to ranges in which the target pixel has a central position.

The operation unit 217 receives, from the Max filter 213, the maximum value peakLMax(x) of the characteristic amount peakL(x) calculated for each pixel of the input image, and receives, from the Min filter 215, the minimum value peakLMin(x) of the characteristic amount peakL(x) calculated for each pixel of the input image.

The operation unit 217 calculates the maximum value peakLMax(x) and minimum value peakLMin(x) of the characteristic amount peakL(x), the differential dltPeakL0(x) of the amplitude, and the absolute value dltPeakL(x) of dltPeakL0(x), for each pixel of the input image. The differential dltPeakL0(x) of the amplitude and the absolute value dltPeakL(x) of dltPeakL0(x) can be calculated based on Equations (17) and (18):

$$\text{dltPeak}L0(x) = |\text{peak}L\text{Max}(x)| - |\text{peak}L\text{Min}(x)| \quad (17), \text{ and}$$

$$\text{dltPeak}L(x) = |\text{dltPeak}L0(x)| \quad (18).$$

In addition, based on dltPeakL0(x) and dltPeakL(x) for each pixel, the operation unit 217 calculates, for each pixel of the input image, a characteristic amount EdgeL that represents the accuracy or certainty that an edge corresponding to that pixel is a line edge. Letting the characteristic amount EdgeL for each pixel be denoted as EdgeL(x), EdgeL(x) can be calculated based on Equations (19) and (20). The constants thL0 and thL1 in Equation (19) are predetermined threshold values that satisfy, for example, a relationship thL0<thL1.

$$EdgeL0(x) = \begin{cases} 0 & dltPeakL(x) < thL0 \\ \dfrac{dltPeakL(x) - thL0}{thL1 - thL0} & thL0 \leq dltPeakL(x) \leq thL1 \\ 1 & thL1 < dltPeakL(x) \end{cases} \quad (19)$$

$$EdgeL(x) = \begin{cases} EdgeL0(x) & dltPeakL0(x) \geq 0 \\ EdgeL0(x) \times -1 & dltPeakL0(x) < 0 \end{cases}. \quad (20)$$

In Equation (20), a case where dltPeakL0(x)≥0 corresponds to a positive peak, and a case where dltPeakL0(x)<0 corresponds to a negative peak.

Figure 11:
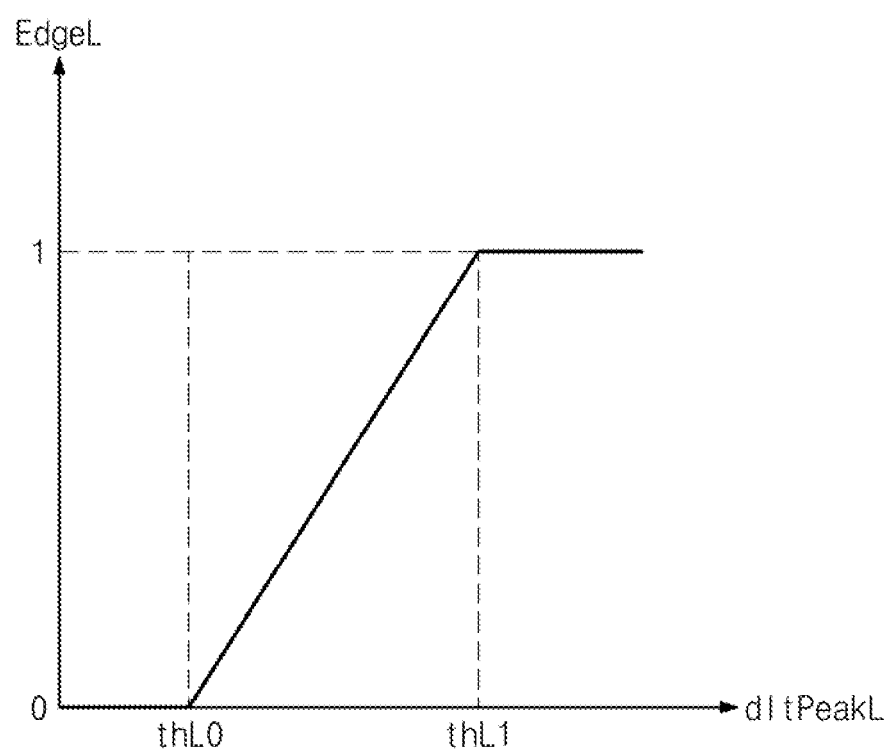
FIG. 11 illustrates an example of a relationship between EdgeL0 and dltPeakL.

FIG. 11 illustrates an example of the relationship between EdgeL0(x) and dltPeakL(x) based on Equation (19) above.

In FIG. 11, the horizontal axis represents dltPeakL(x), and the vertical axis represents EdgeL0(x).

A characteristic amount EdgeL(x) has a greater value when there is a peak for only one of a positive peak and a negative peak within a certain range from a target pixel. On the other hand, the characteristic amount EdgeL(x) may have a lesser value when there are peaks for both a positive peak and a negative peak within a certain range from the target pixel, such as in the case of a toggle edge. In this case, the characteristic amount EdgeT(x) representing the accuracy of the toggle edge to be described below may have a greater value.

As such, the operation unit 217 calculates, for each pixel of the input image, a characteristic amount EdgeL(x) that represents the accuracy or certainty that an edge corresponding to a pixel is a line edge. In addition, the operation unit 217 outputs the characteristic amount EdgeL(x) for each pixel to the operation unit 29 of the blend ratio calculation unit 20.

Continuous Peak Characteristic Amount Calculation Unit 23

The continuous peak characteristic amount calculation unit 23 can calculate, for each pixel of the input image, a characteristic amount EdgeT that represents the accuracy or certainty that an edge corresponding to a pixel is a toggle edge.

Figure 12:
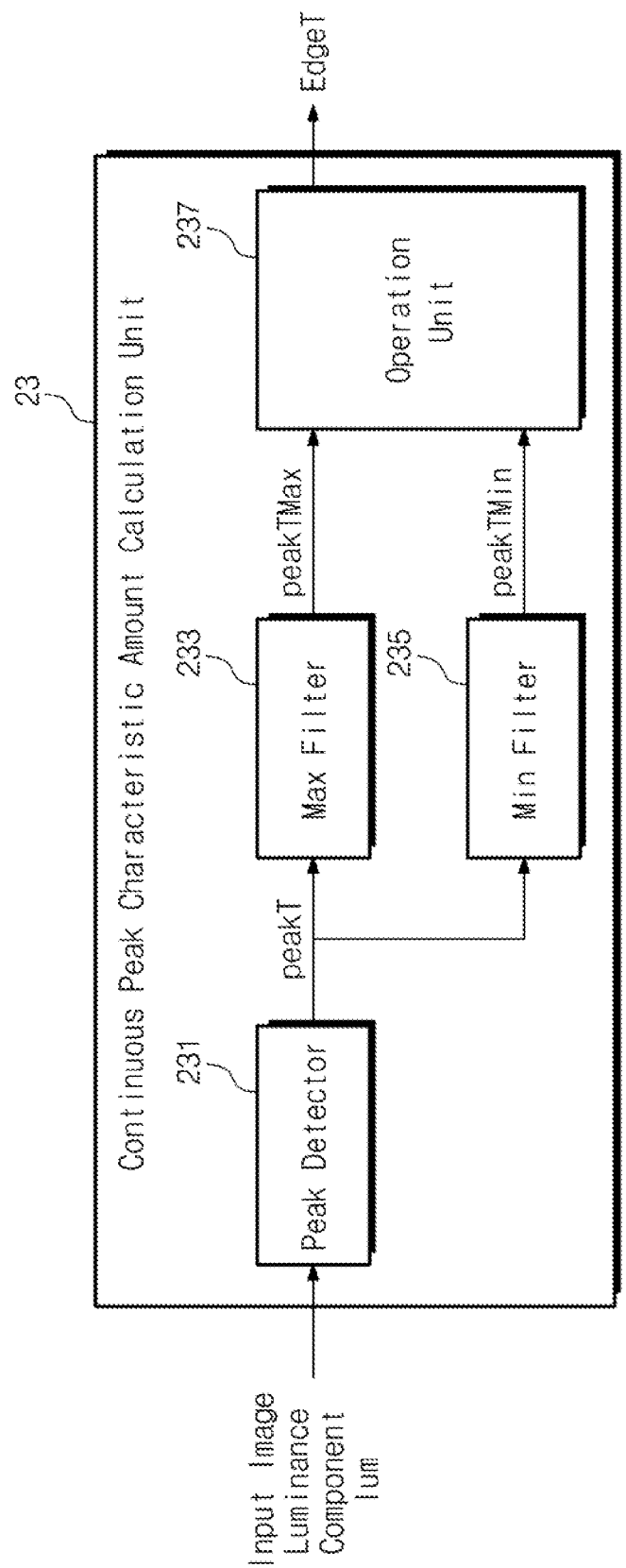
FIG. 12 is a block diagram of an exemplary functional configuration of a continuous peak characteristic amount calculation unit.

FIG. 12 is a block diagram of an exemplary functional configuration of the continuous peak characteristic amount calculation unit 23.

As illustrated in FIG. 12, the continuous peak characteristic amount calculation unit 23 includes a peak detector 231, a Max filter 233, a Min filter 235, and an operation unit 237.

The peak detector 231 processes each pixel of the input image as a target pixel and calculates a gradient grad(x) and laplacian lap(x) based on the luminance components of the target pixel and of adjacent pixels located within a certain range from that target pixel in the x direction. The gradient grad(x) and laplacian lap(x) can be calculated based on Equations (9) and (10) as described above.

The peak detector 231 calculates a characteristic amount peakT(x) that detects a peak portion based on the gradient grad(x) and laplacian lap(x). The characteristic amount peakT(x) can be calculated based on Equations (21) to (23):

$$peakT0(x) = |lap(x)| - |grad(x)| \times pPeakT, \quad (21)$$

$$peakT1(x) = \begin{cases} peakT0(x) & peakT0(x) \geq 0 \\ 0 & peakT0(x) < 0 \end{cases}, \text{ and} \quad (22)$$

$$peakT(x) = \begin{cases} peakT1(x) & lap(x) \geq 0 \\ peakT1(x) \times -1 & lap(x) < 0 \end{cases}. \quad (23)$$

The coefficient pPeakT in Equation (21) adjusts a range for detecting a toggle edge from edges having various line widths. According to embodiments, the coefficient pPeakT corresponds to the coefficient pPeakL in Equation (11). The coefficient pPeakT can be pre-determined based on previous experimental results, like the coefficient pPeakL.

As such, the peak detector 231 calculates a characteristic amount peakT(x) that detects a peak portion for each pixel of the input image and outputs the characteristic amount peakT(x) calculated for each pixel to the Max filter 233 and the Min filter 235.

The Max filter 233 receives, from the peak detector 231, the characteristic amount peakT(x) for each pixel of the input image. The Max filter 233 processes each pixel of the input image as a target pixel and calculates the maximum value of the characteristic amount peakT(x) for each pixel within a certain range from the target pixel, based on each characteristic amount peakT(x) calculated within the certain range.

For example, when the certain range corresponds to five pixels before and after target pixel (x, y) in the x direction, i.e., the range corresponds to 11 pixels in which the target pixel has a central position, the maximum value peakTMax (x) of the characteristic amount peakT(x) can be calculated based on Equation (24):

$$peakTMax(x) = \max_{-5 \leq i \leq 5}(peakT(x+i)). \quad (24)$$

In addition, the Max filter 233 outputs, to the operation unit 237, the maximum value peakTMax(x) of the characteristic amount peakT(x) for each pixel.

The Min filter 235 receives, from the peak detector 231, the characteristic amount peakT(x) for each pixel of the input image. The Min filter 235 processes each pixel of the input image as a target pixel and calculates the minimum value of the characteristic amount peakT(x) for each pixel within a certain range from the target pixel, based on each characteristic amount peakT(x) calculated within the certain range.

For example, when the certain range corresponds to five pixels before and after target pixel (x, y) in the x direction, i.e., the range corresponds to 11 pixels in which the target pixel has a central position, the minimum value peakTMin (x) of the characteristic amount peakT(x) can be calculated based on Equation (25):

$$peakTMin(x) = \min_{-5 \leq i \leq 5}(peakT(x+i)). \quad (25)$$

In addition, the Min filter 235 outputs, to the operation unit 237, the minimum value peakTMin(x) of the characteristic amount peakT(x) for each pixel.

The ranges used by the Max filter 233 and the Min filter 235 to calculate the maximum value peakTMax(x) and minimum value peakTMin(x) of the characteristic amount peakT(x) are exemplary and non-limiting, and embodiments of the inventive concept are not necessarily limited to the disclosed ranges, or to ranges in which the target pixel has a central position.

The operation unit 237 receives, from the Max filter 233, the maximum value peakTMax(x) of the characteristic amount peakT(x) for each pixel of the input image, and receives, from the Min filter 235, the minimum value peakTMin(x) of the characteristic amount peakT(x) for each pixel of the input image.

The operation unit 237 calculates a differential or dynamic range drPeakT(x) and an average avgPeakT(x) based on the maximum value peakTMax(x) and minimum value peakTMin(x) of the characteristic amount peakT(x), for each pixel of the input image. The differential drPeakT (x) can be calculated based on Equation (26):

$$drPeakT(x) = peakTMax(x) - peakTMin(x) \quad (26)$$

The average avgPeakT(x) can be calculated based on Equation (27):

$$avgPeakT(x) = peakTMax(x) + peakTMin(x) \quad (27)$$

In addition, based on the drPeakT(x) and avgPeakT(x) calculated for each pixel, the operation unit 237 calculates, for each pixel, a characteristic amount EdgeT that represents the accuracy or certainty that an edge corresponding to that pixel is a toggle edge. Letting the characteristic amount EdgeT for each pixel be denoted as EdgeT(x), EdgeT(x) can be calculated based on Equations (28) and (29). The constants thT0 and thT1 in Equation (29) are predetermined threshold values that satisfy a relationship of thT0<thT1.

$$detToggle(x) = |drPeakT(x)| - |avgPeakT(x)| \times pT0. \qquad (28)$$

$$EdgeT(x) = \begin{cases} 0 & detToggle(x) < thT0 \\ \dfrac{detToggle(x) - thT0}{thT1 - thT0} & thT0 \le detToggle(x) \le thT1 \\ 1 & thT1 < detToggle(x) \end{cases} \qquad (29)$$

The coefficient pT0 in Equation (28) adjusts the weight between the differential drPeakT(x) and the average avgPeakT(x) when calculating the characteristic amount EdgeT(x) that represents toggle edge similarity. In particular, as the coefficient pT0 increases and the difference between the amplitude of a positive peak and the amplitude of a negative peak decreases, the characteristic amount EdgeT(x) may increase, which indicates that the accuracy of a toggle edge detection increases. In addition, as the coefficient pT0 decreases and the amplitudes of a positive peak and a negative peak differ from each other, such as when the amplitude of one side is larger than that of the other side, the characteristic amount EdgeT(x) increases again indicating that the accuracy of a toggle edge detection has increased. The coefficient pT0 can be pre-determined based on previous experimental results.

Figure 13:
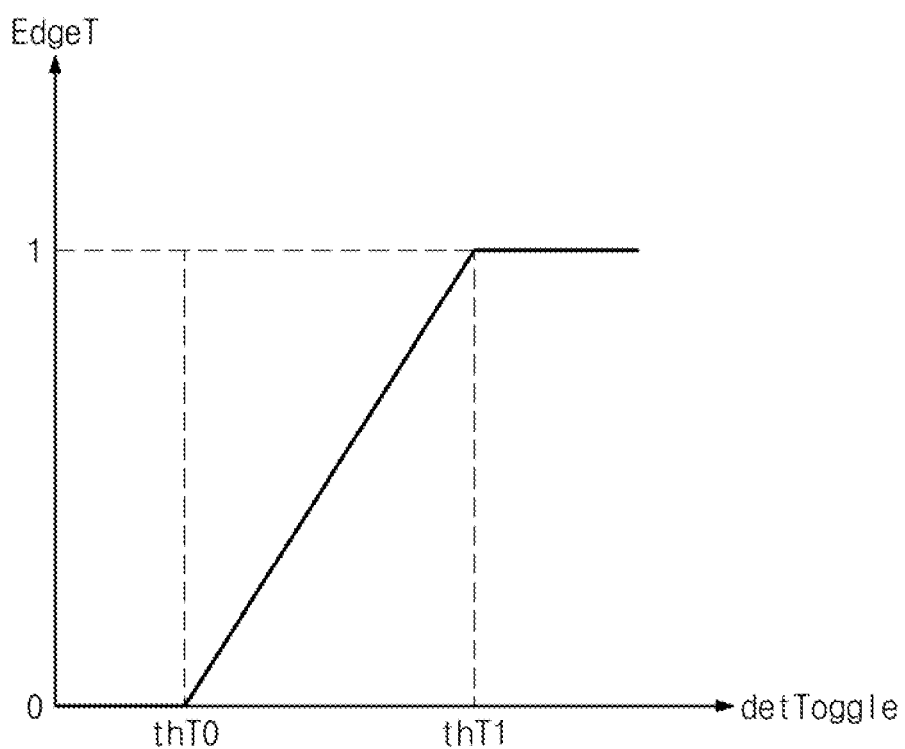
FIG. 13 illustrates an example of a relationship between EdgeT and detToggle.

FIG. 13 illustrates an example of a relationship between EdgeT(x) and detToggle(x) based on Equation (29).

In FIG. 13, the horizontal axis represents detToggle(x), and the vertical axis represents EdgeT(x).

The characteristic EdgeT(x) has a greater value when there are positive and negative peaks within a certain range from a target pixel.

As such, the operation unit 237 calculates, for each pixel of the input image, a characteristic amount EdgeT(x) that represents the accuracy or certainty that an edge corresponding to a pixel is a toggle edge. In addition, the operation unit 237 outputs the characteristic amount EdgeT(x) for each pixel, to the operation unit 29 of the blend ratio calculation unit 20.

Step Edge Characteristic Amount Calculation Unit 25

The step edge characteristic amount calculation unit 25 can calculate, for each pixel in the input image, a characteristic amount EdgeS that represents the accuracy or certainty that an edge corresponding to a pixel is a step edge.

Figure 14:
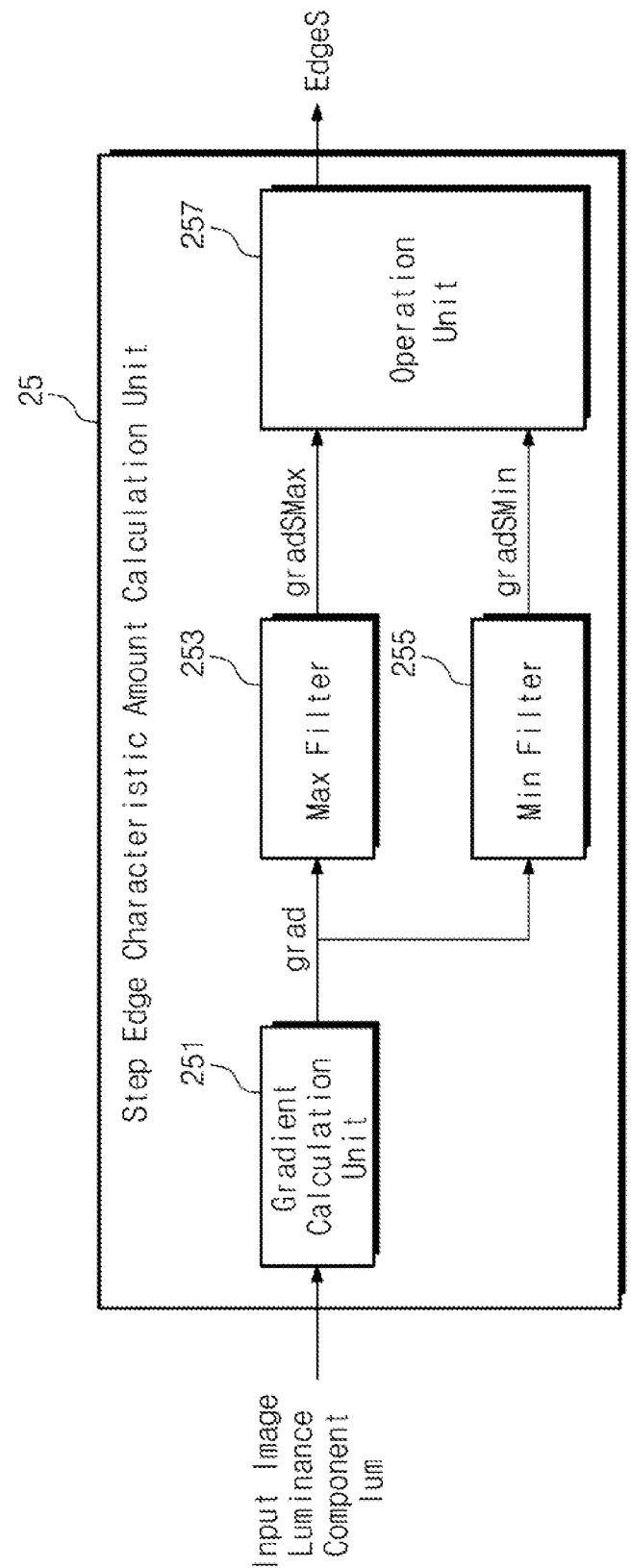
FIG. 14 is a block diagram of an exemplary functional configuration of a step edge characteristic amount calculation unit.

FIG. 14 is a block diagram of an exemplary functional configuration of the step edge characteristic amount calculation unit 25.

Referring to FIG. 14, the step edge characteristic amount calculation unit 25 includes a gradient calculation unit 251, a Max filter 253, a Min filter 255, and an operation unit 257.

The gradient calculation unit 251 processes each pixel of the input image as a target pixel and calculates a gradient grad(x) based on the luminance components of the target pixel and of adjacent pixels located within a certain range from the target pixel in the x direction. The gradient grad(x) can be calculated based on Equation (9) as described above.

The gradient calculation unit 251 outputs the gradient grad(x) for each pixel of the input image to the Max filter 253 and the Min filter 255.

The Max filter 253 receives, from the gradient calculation unit 251, the gradient grad(x) for each pixel of the input image. The Max filter 253 processes each pixel of the input image as a target pixel and calculates the maximum value of the gradient grad(x) for each pixel within a certain range from the target pixel, based on each gradient grad(x) calculated within the certain range.

For example, when the certain range corresponds to five pixels before and after target pixel (x, y) in the x direction, (i.e., the range corresponds to 11 pixels in which the target pixel has a central position, the maximum value gradSMax(x) of the gradient grad(x) can be calculated based on Equation (30):

$$gradSMax(x) = \max_{-5 \le i \le 5} (grad(x + i)). \qquad (30)$$

In addition, the Max filter 253 outputs, to the operation unit 257, the maximum value gradSMax(x) of the gradient grad(x) for each pixel.

The Min filter 255 receives, from the gradient calculation unit 251, the gradient grad(x) for each pixel of the input image. The Min filter 255 processes each pixel of the input image as a target pixel and calculates the minimum value of the gradient grad(x) for each pixel within a certain range from the target pixel, based on each gradient grad(x) calculated within the certain range.

For example, when the certain range corresponds to five pixels before and after target pixel (x, y) in the x direction, i.e., the range corresponds to 11 pixels in which the target pixel has a central position, the minimum value gradSMin(x) of the gradient grad(x) can be calculated based on Equation (31):

$$gradSMin(x) = \min_{-5 \le i \le 5} (gradS(x + i)). \qquad (31)$$

In addition, the Min filter 255 outputs, to the operation unit 257, the minimum value gradSMin(x) of the gradient grad(x) for each pixel.

The ranges used by the Max filter 253 and the Min filter 255 to calculate the maximum value gradSMax(x) and minimum value gradSMin(x) of the gradient grad(x) are exemplary and non-limiting, and embodiments of the inventive concept are not necessarily limited to the disclosed ranges, or to ranges in which the target pixel has a central position.

The operation unit 257 receives, from the Max filter 253, the maximum value gradSMax(x) of the gradient grad(x) for each pixel of the input image, and receives, from the Min filter 255, the minimum value gradSMin(x) of the gradient grad(x) for each pixel of the input image.

The operation unit 257 calculates a differential or dynamic range drGradSMax(x) and an absolute value absGradSMax(x) based on the maximum value gradSMax(x) and minimum value gradSMin(x) of the gradient grad(x), for each pixel of the input image. The differential drGradSMax(x) can be calculated based on Equation (32) below:

$$drGradSMax(x) = gradSMax(x) - gradSMin(x) \qquad (32)$$

The absolute value absGradSMax(x) can be calculated based on Equation (33):

$$absGradSMax(x) = \begin{cases} |gradSMax(x)| & |gradSMax(x)| \geq |gradSMin(x)| \\ |gradSMin(x)| & |gradSMax(x)| < |gradSMin(x)| \end{cases} \quad (33)$$

In this example, the gradient grad(x) is described with reference to FIGS. 15 and 16 when edges to be processed include both a line edge and a step edge.

Figure 15:
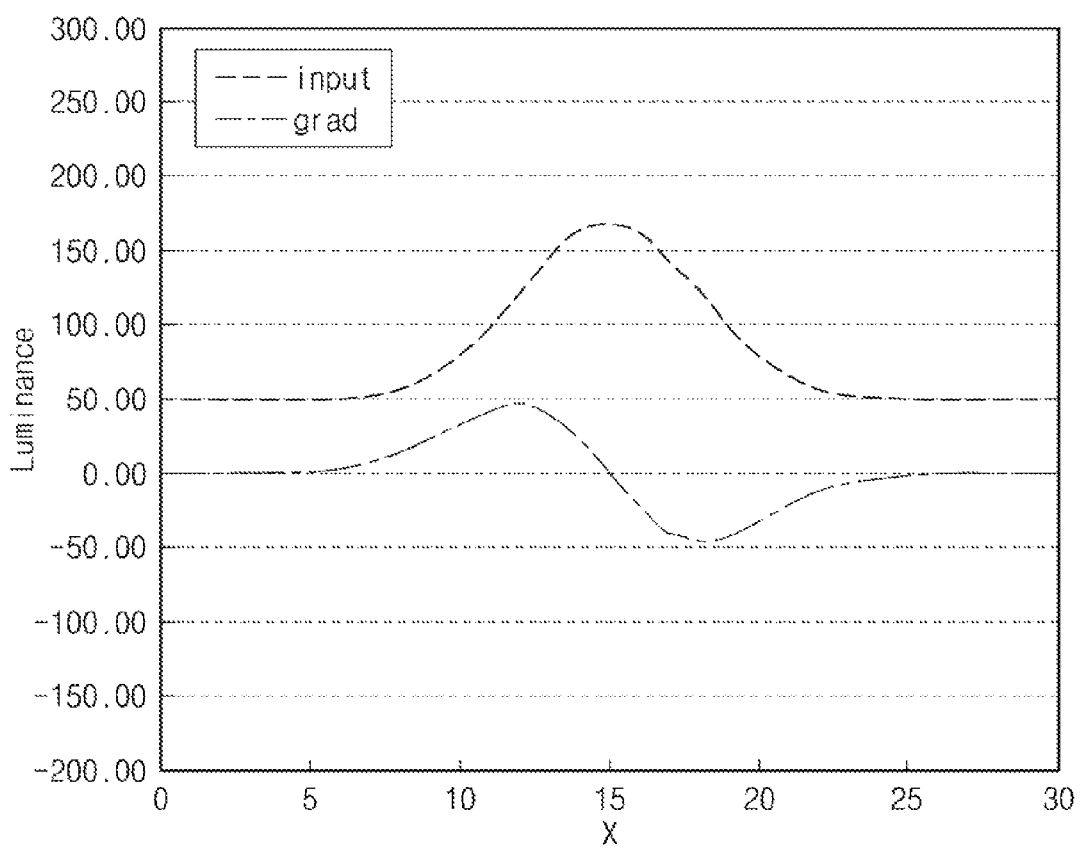
FIG. 15 illustrates an exemplary feature of a gradient in the case of a line edge.

FIG. 15 illustrates an exemplary feature of the gradient grad(x) when the edge to be processed is a line edge. FIG. 16 illustrates an exemplary feature of the gradient grad(x) when the edge to be processed is a step edge.

Figure 16:
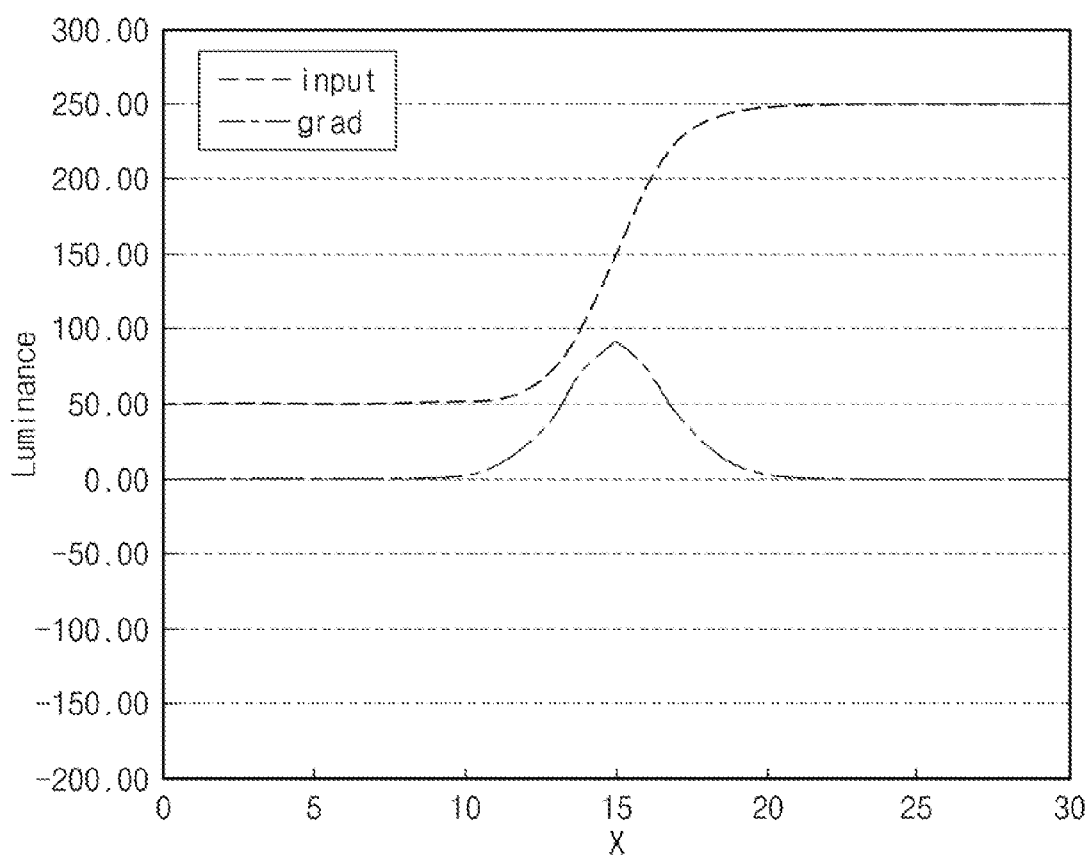
FIG. 16 illustrates an exemplary feature of a gradient in the case of a step edge.

In FIGS. 15 and 16, the horizontal axis represents a location along the x direction of the input image, and the vertical axis represents the pixel value of a corresponding pixel.

For example, in the case of a line edge, the gradient grad(x) may take both a positive value and a negative value, as shown in FIG. 15. In contrast, in the case of a step edge, the calculated gradient grad(x) may take one of a positive value or a negative value, as shown in FIG. 16. That is, when there is a pixel which has only one of a positive value and a negative value and of which the absolute value of the gradient grad(x) is high within a certain range from a target pixel, the accuracy of detecting a step edge tends to increase. The operation unit 257 calculates a characteristic amount EdgeS representing the accuracy or certainty of detecting a step edge by using such a feature.

In particular, based on the drGradSMax(x) and absGradSMax(x) calculated for each pixel, the operation unit 257 calculates, for each pixel, acharacteristic amount EdgeS that represents the accuracy or certainty that an edge corresponding to a pixel is a step edge. Letting the characteristic amount EdgeS for each pixel be denoted EdgeS(x), EdgeS(x) can be calculated based on Equations (34) and (35). The constants thS0 and thS1 in Equation (35) are predetermined threshold values that satisfy a relationship thS0<thS1.

$$detNotStep(x) = \frac{drGradSMax(x)}{absGradSMax(x)}. \quad (34)$$

$$EdgeS(x) = \begin{cases} 0 & detNotStep(x) < thS0 \\ \frac{detNotStep(x) - thS0}{thS1 - thS0} & thS0 \leq detNotStep(x) \leq thS1 \\ 1 & thS1 < detNotStep(x) \end{cases} \quad (35)$$

Figure 17:
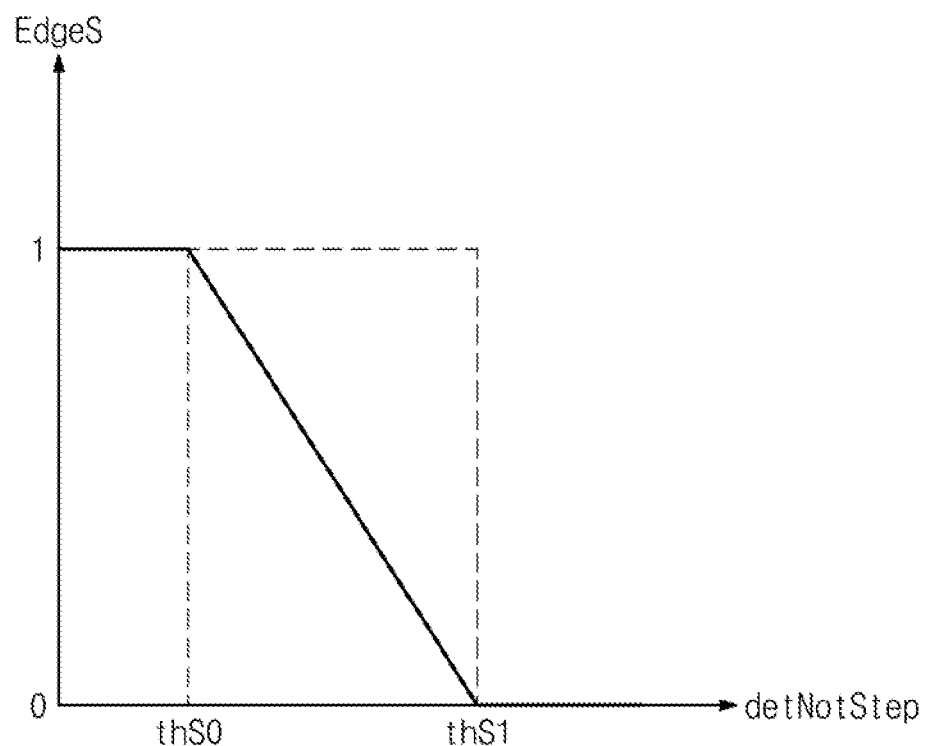
FIG. 17 illustrates an example of a relationship between EdgeS and detNotStep.

FIG. 17 illustrates an example of a relationship between EdgeS(x) and detNotStep(x) based on Equation (35).

In FIG. 17, the horizontal axis represents detNotStep(x), and the vertical axis represents EdgeS(x). In Equations (34) and (35), detNotStep(x) corresponds to a characteristic amount that represents the accuracy that an edge being processed is not a step edge.

The characteristic amount EdgeS(x) may have a greater value for a pixel within a certain range from a target pixel that has one of a positive value and a negative value and of which the absolute value of the gradient grad(x) is high, as described above with reference to FIGS. 15 and 16.

As such, the operation unit 257 calculates, for each pixel of the input image, a characteristic amount EdgeS(x) that represents the accuracy or certainty that an edge corresponding to a pixel is a step edge. In addition, the operation unit 257 outputs the characteristic amount EdgeS(x) for each pixel to the operation unit 29 of the blend ratio calculation unit 20.

Texture Edge Characteristic Amount Calculation Unit 27

The texture edge characteristic amount calculation unit 27 can calculate, for each pixel of the input image, a characteristic amount EdgeX that represents the accuracy of certainty that an edge corresponding to a pixel is a texture edge.

Figure 18:
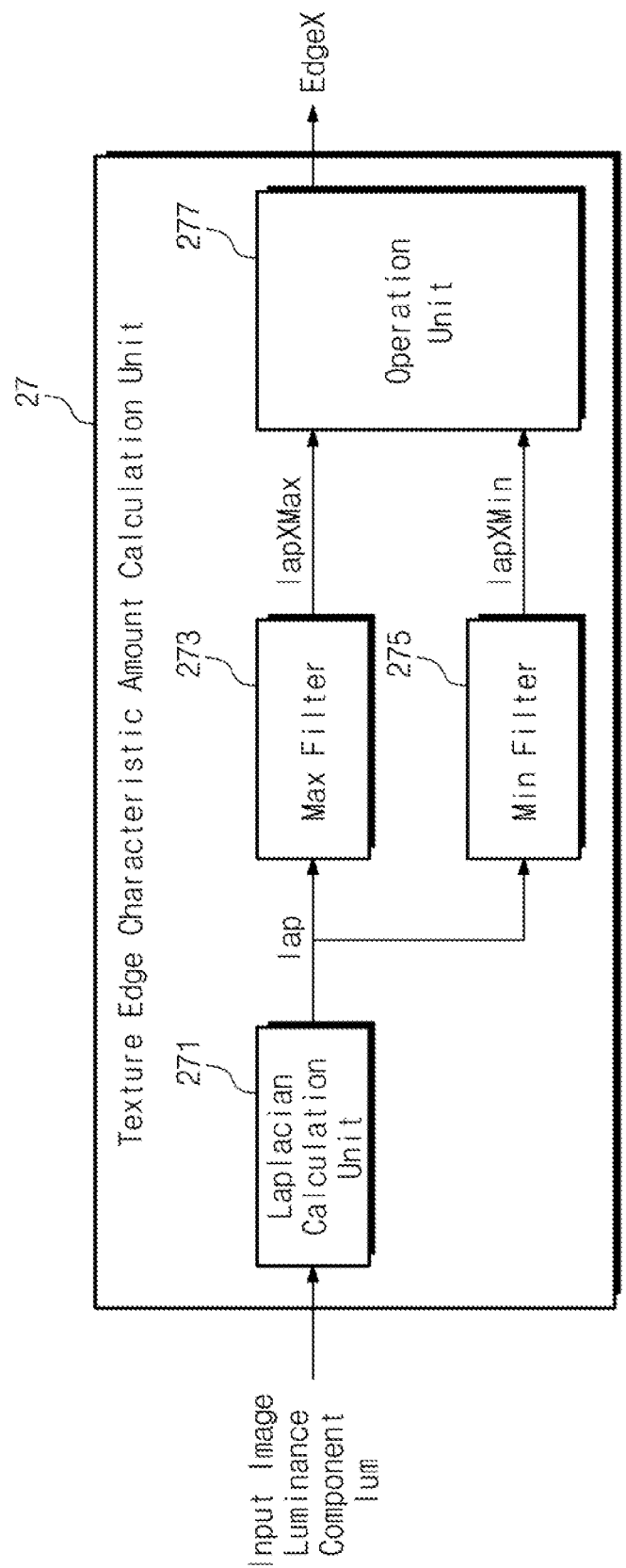
FIG. 18 is a block diagram of an exemplary functional configuration of a texture edge characteristic amount calculation unit.

FIG. 18 is a block diagram of an exemplary functional configuration of the texture edge characteristic amount calculation unit 27.

Referring to FIG. 18, the texture edge characteristic calculation unit 27 includes a laplacian calculation unit 271, a Max filter 273, a Min filter 275, and an operation unit 277.

The laplacian calculation unit 271 processes each pixel of the input image as a target pixel and calculates a laplacian lap(x,y) based on the luminance components of the target pixel and of adjacent pixels located within certain ranges from the target pixel in the x direction and y direction. The laplacian lap(x,y) that corresponds to the target pixel (x,y) can be calculated based on Equation (36) below:

$$lap(x, y) = lum(x + 1, y + 1) + lum(x, y + 1) + lum(x - 1, y + 1) + \quad (36)$$
$$lum(x + 1, y) - lum(x, y) \times 8 + lum(x - 1, y) +$$
$$lum(x + 1, y - 1) + lum(x, y - 1) + lum(x - 1, y - 1).$$

In addition, the laplacian calculation unit 271 outputs the laplacian lap(x,y) for each pixel among input image data, to the Max filter 273 and the Min filter 275.

The Max filter 273 receives, from the laplacian calculation unit 271, the laplacian (x,y) for each pixel of the input image. The Max filter 273 processes each pixel of the input image as a target pixel and calculates the maximum value of the laplacian lap (x,y) for each pixel within a certain range from the target pixel, based on each laplacian lap (x,y) calculated within the certain range.

For example, when the certain range corresponds to two pixels before and after target pixel (x, y) in the x direction and y direction, i.e., the range corresponds to 5×5 pixels in which the target pixel has a central position, the maximum value lapXMax(x,y) of the laplacian lap(x,y) can be calculated based on Equation (37):

$$lapXMax(x, y) = \max_{\substack{-2 \leq i \leq 2 \\ -2 \leq j \leq 2}} (lap(x + i, y + j)). \quad (37)$$

In addition, the Max filter 273 outputs, to the operation unit 277, the maximum value lapXMax(x) of the laplacian lap(x,y) for each pixel.

The Min filter 275 receives, from the laplacian calculation unit 271, the laplacian (x,y) for each pixel of the input image. The Min filter 275 processes each pixel of the input image as a target pixel and calculates the minimum value of the laplacian lap (x,y) for each pixel within a certain range from the target pixel, based on each laplacian lap (x,y) calculated within the certain range.

For example, when the certain range corresponds to two pixels before and after target pixel (x, y) in the x direction and y direction, i.e., the range corresponds to 5×5 pixels in which the target pixel has a central position, the minimum value lapXMin (x,y) of the laplacian lap (x,y) can be calculated based on Equation (38):

$$lapXMin(x, y) = \min_{\substack{-2 \le i \le 2 \\ -2 \le j \le 2}} (lap(x+i, y+j)). \quad (38)$$

In addition, the Min filter 275 outputs, to the operation unit 277, the minimum value lapXMin (x,y) of the laplacian lap (x,y) for each pixel.

The range used by the Max filter 273 and the Min filter 275 to calculate the maximum value lapXMax (x) and minimum value lapXMin (x) of the laplacian lap (x,y) is exemplary and non-limiting, and embodiments of the inventive concept are not necessarily limited to the disclosed ranges or to ranges in which the target pixel has a central position.

The operation unit 277 receives, from the Max filter 273, the maximum value lapXMax(x,y) of the laplacian lap (x,y) for each pixel of the input image, and receives, from the Min filter 275, the minimum value lapXMin(x,y) of the laplacian lap(x,y) for each pixel of the input image.

The operation unit 277 calculates an absolute value absLapXMax(x,y) for each pixel of the input image based on the maximum value lapXMax(x,y) and minimum value lapXMin(x,y) of the Laplacian lap(x,y). The absolute value absLapXMax(x,y) can be calculated based on Equation (39):

$$absLapXMax(x, y) = \begin{cases} |lapXMax(x, y)| & |lapXMax(x, y)| \ge |lapXMin(x, y)| \\ |lapXMin(x, y)| & |lapXMax(x, y)| < |lapXMin(x, y)| \end{cases} \quad (39)$$

In addition, based on the absolute value absLapXMax(x, y) calculated for each pixel, the operation unit 277 calculates, for each pixel, a characteristic amount EdgeX that represents the accuracy or certainty that an edge corresponding to the pixel is a texture edge. Letting the characteristic amount EdgeX for each pixel be denoted as EdgeX(x,y), EdgeX(x,y) can be calculated based on Equation (40). The constants thX0 and thX1 in Equation (40) are predetermined threshold values that satisfy a relationship thX0<thX1.

$$EdgeX(x, y) = \begin{cases} 0 & absLapXMax(x, y) < thX0 \\ \dfrac{absLapXMax(x, y) - thX0}{thX1 - thX0} & thX0 \le absLapXMax(x, y) \le thX1 \\ 1 & thX1 < absLapXMax(x, y) \end{cases} \quad (40)$$

Figure 19:
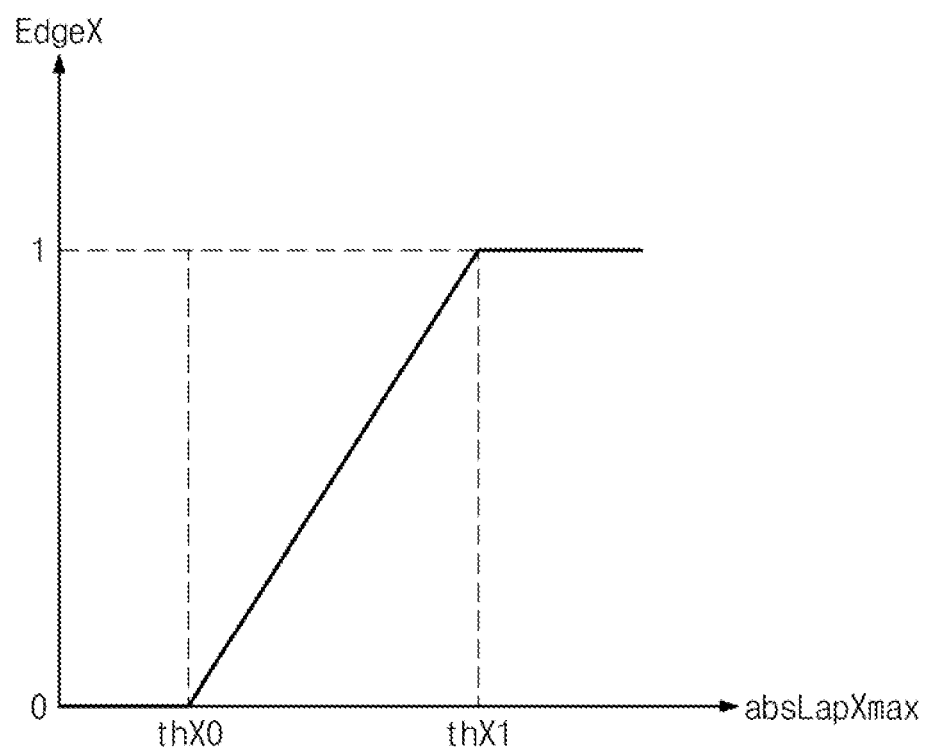
FIG. 19 illustrates an example of a relationship between EdgeX and absLapXMax.

FIG. 19 illustrates an example of the relationship between EdgeX(x,y) and absLapXMax(x,y) that are based on Equation (40). In FIG. 19, the horizontal axis represents absLapXMax(x,y), and the vertical axis represents EdgeX (x,y). When absLapXMax(x,y) is less than the threshold value thX0, it is determined that there is noise and the characteristic amount EdgeX(x,y) is set to zero, as shown in FIG. 19.

As such, the operation unit 277 calculates, for each pixel of the input image, a characteristic amount EdgeX(x,y) that represents the accuracy or certainty that an edge corresponding to a pixel is a texture edge. In addition, the operation unit 277 outputs the characteristic amount EdgeT(x) for each pixel to the operation unit 29 of the blend ratio calculation unit 20.

Operation Unit 29

The operation unit 29 receives from the single peak characteristic amount calculation unit 21 a characteristic amount EdgeL for each pixel of the input image. Likewise, the operation unit 29 receives from the continuous peak characteristic amount calculation unit 23 a characteristic amount EdgeT for each pixel of the input image. In addition, the operation unit 29 receives a characteristic amount EdgeS for each pixel of the input image from the step edge characteristic amount calculation unit 25 and receives a characteristic amount EdgeX for each pixel from the texture edge characteristic amount calculation unit 27.

The operation unit 29 calculates weights that are applied to gains GainL, GainT, GainS, and GainX that respectively correspond to edges based on received characteristic amounts EdgeL, EdgeT, EdgeS, and EdgeX. The weights applied to the gains GainL, GainT, GainS, and GainX represent the application ratios of gains corresponding to the edges, respectively. Each of the gains GainL, GainT, GainS, and GainX corresponds to an example of a first gain.

In this example, letting the weights applied to the gains GainL, GainT, GainS, and GainX be respectively denoted as BldL, BldT, BldS, and BldX, each weight can be calculated based on Equation (41) below:

$$BldT = EdgeT$$

$$BldS = (1 - EdgeT) \times EdgeS$$

$$BldL = (1 - EdgeT) \times (1 - EdgeS) \times EdgeL$$

$$BldX = \{1 - (BldT + BldS + |BldL|)\} \times EdgeX \quad (41)$$

As such, the operation unit 29 calculates the weights BldL, BldT, BldS, and BldX and outputs the weights BldL, BldT, BldS, and BldX, to the gain adjustment unit 30 of the H direction gain control unit 3a.

Gain Adjustment Unit 30

The gain adjustment unit 30 can adjust, for each pixel of the input image, a gain applied to that pixel based on a gain corresponding to each edge calculated for that pixel and a weight for each gain corresponding to each edge.

In particular, the gain adjustment unit 30 receives from the line gain calculation unit 11 a line gain GainL for each pixel of the input image. Likewise, the gain adjustment unit 30 receives from the step gain calculation unit 12 a step gain GainS for each pixel of the input image. In addition, the gain adjustment unit 30 receives from the toggle gain calculation unit 13 a toggle gain GainT for each pixel of the input image, and receives from the texture gain calculation unit 14 a texture gain GainX calculated for that pixel. The gains GainL, GainS, GainT, and GainX corresponding respectively to edges calculated for pixel (x,y) may be denoted by GainL(x,y), GainS(x,y), GainT(x,y), and GainX(x,y) in the following description.

The gain adjustment unit 30 also receives, from the blend ratio calculation unit 20, weights BldL, BldT, BldS, and BldX for gains corresponding respectively to edges calculated for each pixel of the input image. The weights BldL, BldT, BldS, and BldX for gains corresponding respectively to edges calculated for pixel (x,y) may be denoted by BldL(x,y), BldT(x,y), BldS(x,y), and BldX(x,y) in the following description.

The gain adjustment unit 30 calculates a gain applied to a pixel, based on gains GainL(x,y), GainS(x,y), GainT(x,y), and GainX(x,y) corresponding respectively to edges received for each pixel and weights BldL(x,y), BldT(x,y), BldS(x,y), and BldX(x,y). A gain applied to each pixel of the input image is calculated for both the horizontal H direction and the vertical V direction. That is, gain GainBldH(x,y) corresponding to the H direction is calculated by the gain adjustment unit 30 of the gain control unit 3a, and gain GainBldV(x,y) corresponding to the V direction is calculated by the gain adjustment unit 30 of the gain control unit 3b.

GainBldH(x,y) and GainBldV(x,y) applied to each pixel of the input image can be calculated based on Equation (42). The symbol "*" in Equation (42) represents any one of H and V.

$$GainBld^*(x, y) = \\ GainL(x, y) \times BldL(x, y) + GainS(x, y) \times BldS(x, y) + \\ GainT(x, y) \times BldT(x, y) + GainX(x, y) \times BldX(x, y).$$ (42)

As such, the gain adjustment unit 30 of the gain control unit 3a calculates the gain GainBldH(x,y) corresponding to the H direction for each pixel of the input image and outputs the gain GainBldH(x,y) for each pixel to the adder 4. Likewise, the gain adjustment unit 30 of the gain control unit 3b calculates the gain GainBldV(x,y) corresponding to the V direction for each pixel of the input image and outputs the gain GainBldV(x,y) for each pixel to the adder 4. Each of the gains GainBldH(x,y) and GainBldV(x,y) corresponds to an example of a second gain.

Adder 4

The adder 4 receives, from the gain control unit 3a, the gain GainBldH(x,y) corresponding to the H direction for each pixel of the input image, and receives, from the gain control unit 3b, the gain GainBldV(x,y) corresponding to the V direction for each pixel of the input image.

The adder 4 applies the gains GainBldH(x,y) and GainBldH(x,y) corresponding to each pixel of the input image to the luminance component lum(x,y) of that pixel to calculate the luminance component lumOut(x,y) corresponding to each pixel of the output image. The luminance component lumOut(x,y) corresponding to each pixel of the output image can be calculated based on Equation (43):

$$lumOut(x,y)=lum(x,y)+GainBldH(x,y)+GainBldV(x,y)$$ (43)

By a configuration as described above, edge emphasis can be performed on the luminance component lum(x,y) of each pixel of the output image based on edge features of that pixel to calculate the luminance component lumOut(x,y) for each pixel of the output image.

The adder 4 outputs, to the YCbCr-RGB conversion unit 6, the luminance component lumOut(x,y) for each pixel of the output image, i.e., the luminance component Y of each pixel of the input image on which edge emphasis has been performed.

The YCbCr-RGB conversion unit 6 converts the luminance component Y of each pixel received from the adder 4 and the chrominance components Cb and Cr of each pixel received from the RGB-YCbCr conversion unit 5 into RGB components to generate output image data and output the output image data.

An exemplary configuration of the emphasis unit 2 according to a present embodiment, especially, each of the gain control units 3a and 3b and the adder 4, has been described above in detail with reference to FIGS. 4 to 19.

The image processing apparatus 1 according to a present embodiment to use emphasis unit 2 to perform edge emphasis on the image data magnified by the magnification unit 9, as described above.

In general, when magnification has been performed on image data, pixel values near an edge in the image decrease and that edge tends to become dull or blunt, as described above. Therefore, when a configuration performs edge emphasis on a magnified image, such as image processing apparatus 1 according to a present embodiment, it can narrow a line width of a line edge and sharpen pixel value changes of a step edge.

In particular, in the formula of the line gain GainL(x) described above with Equation (4), the line width of a line edge can be controlled after emphasis by adjusting coefficients pLine0P and pLine0M. in addition, in the formula of the step gain GainS(x) described above with Equation (6), changes in pixel values of a step edge can be controlled after emphasis by adjusting the coefficient pStep.

In addition, a series of operations as described above may be implemented by a program for operating the central processing unit (CPU) of a device operating each configuration of the image processing apparatus 1. The program may be configured to be executed by an operating system (OS) installed in the device. The program is not limited to a storage location if the device can read therefrom. For example, the program can be stored in an external recording medium connected to the device. In this case, by connecting the recording medium storing the program to the device, there is a need only for a CPU of the device to execute that program.

3. Variations 3.1. Variation 1

A description of an image processing apparatus according to Variation 1 focuses on the emphasis unit 2. When there is a need to explicitly distinguish the emphasis unit 2 according to Variation 1 from the emphasis unit 2 according to an above-described embodiment in the following description, the former may be denoted by emphasis unit 2'.

The emphasis unit 2 according to an above-described embodiment converts the RGB component of each pixel of input image data into a luminance component Y and chrominance components Cb and Cr and performs edge emphasis on only the luminance component Y.

In contrast, the emphasis unit 2' according to Variation 1 differs from the emphasis unit 2 of FIG. 3 according to an above-described embodiment in that the edge emphasis is performed on the RGB component of each pixel of input image data.

Figure 20:
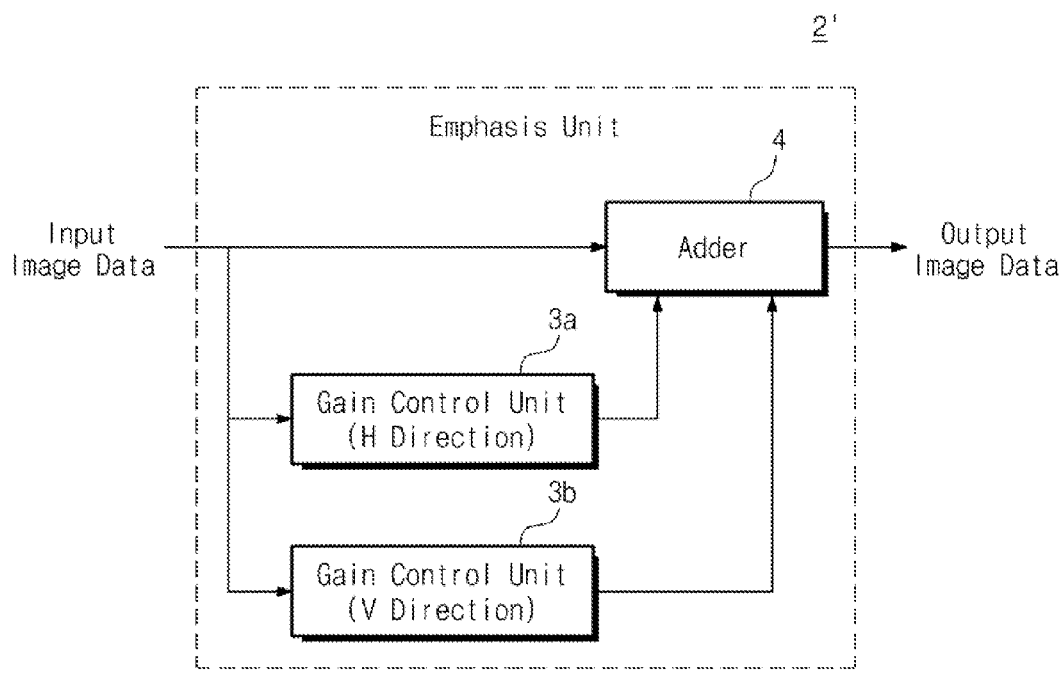
FIG. 20 is a block diagram of an exemplary functional configuration of an emphasis unit according to Variation 1.

FIG. 20 is a block diagram of an exemplary functional configuration of the emphasis unit 2' according to Variation 1.

As shown in FIG. 20, the emphasis unit 2' according to Variation 1 includes gain control units 3a and 3b and an adder 4. In the emphasis unit 2' according to Variation 1, the gain control units 3a and 3b and the adder 4 are the same as the gain control units 3a and 3b and the adder 4 according to an above-described embodiment in terms of processing details except that the RGB component of each pixel of input image data is processed.

As described in Variation 1 above, the emphasis unit 2 may perform edge emphasis on the RGB component of each pixel of input image data.

3.2. Variation 2

Figure 21:
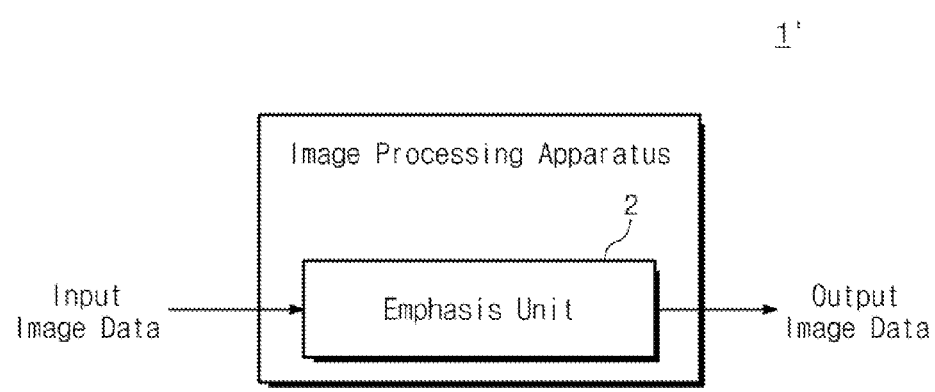
FIG. 21 is a block diagram of an exemplary functional configuration of an image processing apparatus according to Variation 2.

FIG. 21 is a block diagram of an exemplary functional configuration of an image processing apparatus according to Variation 2.

In the following description, when there is a need to explicitly distinguish an image processing apparatus according to Variation 2 from the image processing apparatus 1 according to an above-described embodiment, the former is referred to as image processing apparatus 1'.

The image processing apparatus 1 according to an above-described embodiment includes a magnification unit 9 and an emphasis unit 2 as shown in FIG. 1, performs magnification on input image data and then performs edge emphasis on the magnified image. In contrast, the image processing apparatus 1' according to Variation 2 differs from the image processing apparatus 1 according to an above-described embodiment in that the former does not include the magnification unit 9. That is, the image processing apparatus 1' according to Variation 2 performs edge emphasis on the input image data itself.

The functional configuration and processing details of the emphasis unit 2 according to Variation 2 are the same as those of the emphasis unit 2 of FIGS. 1, 3 and 4 according to an above-described embodiment.

When no magnification is performed on input image data, but edge emphasis has been performed thereon, image data may be output in which a line edge or a step edge has been excessively emphasized. This is because, when magnification has been performed on image data, more natural image data or image data close to an original image is generated by correcting, by edge emphasis, a dull edge changed by magnification.

Therefore, when the input image data itself is a subject to be processed, an emphasis for a line edge or step edge may be decreased as compared to when magnified image data is a subject. In addition, it is possible to adjust an emphasis amount for a line edge, i.e., line gain GainL(x), by adjusting coefficients pLine0P and pLine0M in the formula of the line gain GainL(x) described above with Equation (4), and it is possible to adjust an emphasis amount for a step edge, i.e., step gain GainS(x), by adjusting the coefficient pStep in the formula of the line gain GainS(x) described above with Equation (6).

In addition, when no magnification is performed on the input image data, image data having enhanced definition may be obtained by performing edge emphasis on image data so that a complex edge such as a texture edge is further emphasized. In this case, an emphasis amount may be increased for the texture edge. In addition, it is possible to adjust the emphasis amount for the texture edge, i.e., texture gain GainX(x), by adjusting the coefficient pTexture in the formula of the texture gain GainX(x) described above with Equation (8).

As described in Variation 2, an image processing apparatus according to a present embodiment can perform edge emphasis on image data without magnifying the input image data.

4. Summary

As described above, the image processing apparatus 1 according to a present embodiment classifies edges of input image data into various types and applies a gain based on the edge classification to perform edge emphasis. By such a configuration, the image processing apparatus 1 according to a present embodiment may inhibit ringing and more effectively output an image having an emphasized edge.

In addition, the image processing apparatus 1 according to a present embodiment can calculate, for an edge to be processed, a characteristic amount that represents the accuracy of detecting that edge for each type of edge and can controls the amount of gain calculated for each type of edge based on the characteristic amount. By such a configuration, the image processing apparatus 1 according to a present embodiment may apply a gain based on an edge feature of a complex edge that may be challenging to classify. That is, the image processing apparatus 1 according to a present embodiment can inhibit the generation of ringing from a complex edge that is challenging to classify and more effectively perform edge emphasis.

Although exemplary embodiments of the inventive concept have been described above in detail with reference to the accompanying drawings, embodiments of the inventive concept are not limited thereto. It is understood that a person skilled in the art to which the inventive concept is pertains may obtain various alternations and modifications within the scope of the technical spirit in the following claims and it is construed that they also fall within the technical scope of the inventive concept.

What is claimed is:

1. An image processing apparatus comprising:
   a gain calculation unit that calculates a plurality of first gains that respectively correspond to a plurality of predetermined edges based on a target pixel value and values of pixels adjacent to the target pixel;
   a blend ratio calculation unit that calculates a plurality of characteristic amounts that represent an accuracy of detecting the plurality of edges based on the target pixel value and the values of pixels adjacent to the target pixel and calculates a plurality of weights that respectively correspond to the plurality of first gains based on the plurality of characteristic amounts;
   a gain adjustment unit that calculates a second gain based on the plurality of first gains and the plurality of weights; and
   an output image generation unit that applies the second gain to the target pixel value to generate output image data.

2. The image processing apparatus of claim 1, wherein the blend ratio calculation unit calculates the plurality of characteristic amounts based on a gradient and laplacian calculated based on values of pixels located within a certain range of the target pixel.

3. The image processing apparatus of claim 2, wherein the blend ratio calculation unit
   calculates, for a first edge of the plurality of edges, a plurality of first characteristic amounts based on the gradient and laplacian,
   calculates maximum and minimum values of the plurality of first characteristic amounts from the plurality of first characteristic amounts, and
   calculates a second characteristic amount that represents an accuracy of detecting the first edge based on a differential between absolute values of the maximum and minimum values.

4. The image processing apparatus of claim 2, wherein the blend ratio calculation unit
   calculates, for a second edge of the plurality of edges, a plurality of first characteristic amounts based on the gradient and laplacian,
   calculates maximum and minimum values of the plurality of first characteristic amounts from the plurality of first characteristic amounts, and calculates a second characteristic amount that represents an accuracy of detecting the second edge based on a differential between the maximum and minimum values and an average of the maximum and minimum values.

5. The image processing apparatus of claim 1, wherein the blend ratio calculation unit calculates a characteristic amount that represents an accuracy of detecting a third edge of the plurality of edges based on a plurality of gradients calculated based on values of pixels in a certain range of the target pixel.

6. The image processing apparatus of claim 5, wherein the blend ratio calculation unit calculates the characteristic amount based on a differential between maximum and minimum values of the plurality of gradients and an absolute value of a gradient calculated based on the target pixel.

7. The image processing apparatus of claim 1, wherein the blend ratio calculation unit calculates a characteristic amount that represents an accuracy of detecting a fourth edge of the plurality of edges based on a plurality of laplacians calculated based on values of pixels in a certain range of the target pixel.

8. The image processing apparatus of claim 7, wherein the blend ratio calculation unit determines a greater of absolute values of maximum and minimum values of the plurality of laplacians as the characteristic amount.

9. The image processing apparatus of claim 1, wherein the gain calculation unit calculates the plurality of first gains based on gradients and laplacians of the target pixel calculated based on values of pixels adjacent to the target pixel.

10. The image processing apparatus of claim 1, wherein the plurality of first gains comprise a horizontal first gain calculated based on values of pixels adjacent to the target pixel in a horizontal direction and a vertical first gain calculated based on values of pixels adjacent to the target pixel in a vertical direction.

11. The image processing apparatus of claim 1, further comprising a magnification unit that magnifies first image data having a first resolution to convert the first image data into second image data having a second resolution higher than the first resolution and outputs the second image data as the input image data.

12. An image processing method comprising:
calculating a plurality of first gains that respectively correspond to a plurality of predetermined edges based on a target pixel value of an input image and values of pixels adjacent to the target pixel;
calculating a plurality of characteristic amounts that represent an accuracy of detecting each of the plurality of edges based on the target pixel value and the values of pixels adjacent to the target pixel;
calculating a plurality of weights that respectively correspond to the plurality of predetermined edges based on the plurality of characteristic amounts;
calculating a second gain based on the plurality of first gains and the plurality of weights; and
applying the second gain to the target pixel value to generate an output image.

13. The method of claim 12, wherein the plurality of first gains are calculated from gradients and laplacians of the target pixel calculated based on values of pixels adjacent to the target pixel.

14. The method of claim 12, wherein calculating the plurality of characteristic amounts comprises:
calculating, for a first edge of the plurality of edges, a plurality of first characteristic amounts based on a gradient and laplacian calculated based on values of pixels located within a certain range of the target pixel,
calculating maximum and minimum values of the plurality of first characteristic amounts from the plurality of first characteristic amounts, and
calculating a second characteristic amount that represents an accuracy of detecting the first edge based on a differential between absolute values of the maximum and minimum values,
wherein a weight for the first edge is calculated from the second characteristic amount.

15. The method of claim 12, wherein calculating the plurality of characteristic amounts comprises:
calculating, for a second edge of the plurality of edges, a plurality of first characteristic amounts based on a gradient and laplacian calculated based on values of pixels located within a certain range of the target pixel,
calculating maximum and minimum values of the plurality of first characteristic amounts from the plurality of first characteristic amounts, and
calculating a second characteristic amount that represents an accuracy of detecting the second edge based on a differential between the maximum and minimum values and an average of the maximum and minimum values,
wherein a weight for the second edge is calculated from the second characteristic amount.

16. The method of claim 12, wherein calculating the plurality of characteristic amounts comprises:
calculating a characteristic amount that represents an accuracy of detecting a third edge of the plurality of edges based on a differential between maximum and minimum values of a plurality of gradients calculated based on values of pixels in a certain range of the target pixel, and an absolute value of a gradient calculated based on the target pixel.

17. The method of claim 12, wherein calculating the plurality of characteristic amounts comprises:
calculating a characteristic amount that represents an accuracy of detecting a fourth edge of the plurality of edges based on a plurality of laplacians calculated based on values of pixels in a certain range of the target pixel, and
determining a greater of absolute values of maximum and minimum values of the plurality of laplacians as the characteristic amount.

18. The method of claim 12, further comprising magnifying first image data having a first resolution to convert the first image data into second image data having a second resolution higher than the first resolution and outputting the second image data as the input image data.

19. An image processing apparatus comprising:
a first edge characteristic amount calculation unit that calculates, for a first edge of a plurality of edges, a plurality of first characteristic amounts based on a gradient and laplacian calculated based on values of pixels located within a certain range of a target pixel, maximum and minimum values of the plurality of first characteristic amounts from the plurality of first characteristic amounts, and a second characteristic amount that represents an accuracy of detecting the first edge based on a differential between absolute values of the maximum and minimum values;
a second edge characteristic amount calculation unit that calculates, for a second edge of the plurality of edges, a plurality of third characteristic amounts based on a gradient and laplacian calculated based on values of pixels located within a certain range of the target pixel, maximum and minimum values of the plurality of first characteristic amounts from the plurality of first characteristic amounts, and a fourth characteristic amount that represents an accuracy of detecting the second edge based on a differential between the maximum and minimum values and an average of the maximum and minimum values;

a third edge characteristic amount calculation unit that calculates, for a third edge of the plurality of edges, a differential between maximum and minimum values of a plurality of gradients calculated based on values of pixels in a certain range of the target pixel, and a fifth characteristic amount based on an absolute value of a gradient calculated based on the target pixel;

a fourth edge characteristic amount calculation unit that calculates, or a fourth edge of the plurality of edges, a plurality of laplacians based on values of pixels in a certain range of the target pixel, and a sixth characteristic amount based on a greater of absolute values of maximum and minimum values of the plurality of laplacians; and an operation unit that calculates a plurality of weights based on the second, fourth, fifth, and sixth characteristic amounts that respectively correspond to the plurality of edges to create an edge-enhanced image.

20. The image processing apparatus of claim 19, further comprising:

a gain calculation unit that calculates a plurality of first gains that respectively correspond to the plurality of predetermined edges based on the target pixel value and values of pixels adjacent to the target pixel;

a gain adjustment unit that calculates a second gain based on the plurality of first gains and the plurality of weights; and an output image generation unit that applies the second gain to the target pixel value to generate output image data.

* * * * *